United States Patent [19]
Kaschke

[11] Patent Number: 5,898,933
[45] Date of Patent: Apr. 27, 1999

[54] APPARATUS AND METHOD FOR GENERATING A CONTROL SIGNAL RESPONSIVE TO A MOVABLE ANTENNA

[75] Inventor: Kevin D. Kaschke, Palatine, Ill.

[73] Assignee: Motorola, Inc., Schaumburg, Ill.

[21] Appl. No.: 07/729,502

[22] Filed: Jul. 12, 1991

[51] Int. Cl.⁶ .................................................. H04B 1/38
[52] U.S. Cl. .............................. 455/575; 455/574; 455/90
[58] Field of Search ................................. 455/78, 82, 89, 455/90, 127, 280, 343; 379/61, 433, 424, 425; 343/702, 775

[56] References Cited

U.S. PATENT DOCUMENTS

| | | |
|---|---|---|
| 4,313,119 | 1/1982 | Garay et al. . |
| 4,471,493 | 9/1984 | Schober . |
| 4,511,764 | 4/1985 | Nakayama et al. .................... 379/96 X |
| 4,521,776 | 6/1985 | Smoot et al. ....................... 340/825.44 |
| 4,798,975 | 1/1989 | Walczak et al. ......................... 307/350 |
| 4,845,772 | 7/1989 | Metroka et al. .......................... 435/90 |
| 4,862,182 | 8/1989 | Egashira .................................. 343/702 |
| 4,897,873 | 1/1990 | Beutler et al. ........................... 379/433 |
| 5,014,346 | 5/1991 | Phillips et al. . |
| 5,109,539 | 4/1992 | Inubushi et al. ........................... 455/89 |
| 5,138,329 | 8/1992 | Saarnimo et al. ...................... 343/702 |
| 5,144,324 | 9/1992 | Chin et al. ........................... 455/127 X |
| 5,151,946 | 9/1992 | Martensson ........................ 339/433 X |
| 5,175,759 | 12/1992 | Metroka et al. ......................... 455/575 |
| 5,555,449 | 9/1996 | Kim . |

FOREIGN PATENT DOCUMENTS

| | | |
|---|---|---|
| 0415703 A1 | 3/1991 | European Pat. Off. . |
| 60-022801 | 5/1985 | Japan . |
| 404167741 | 6/1992 | Japan . |

OTHER PUBLICATIONS

FCC Filing No. ACJ96NKX–13000–discloses a cordless telephone manufactured by the Panasonic Company distinguished by model No. KX–T3000.

"Information Management in the Personal Communications Decade", published in *Cellular Business*, in Dec. 1990, p. 40.

Advertisements for portable cellular radiotelephones by NEC America, Inc., Panasonic, Inc., Technophone Corp., Miitsubishi International Corp., DiamondTel by Mitsubishi Electronics, Nokia–Mobira, Inc., Oki Electric Industry Company, and Novatel, Inc., published in Cellular Business, Jun. 1991.

*Primary Examiner*—Edward F. Urban
*Attorney, Agent, or Firm*—Kevin D. Kaschke

[57] ABSTRACT

In a radiotelephone (200) having a moveable antenna (213), an apparatus and method generates a control signal (511 or 412) responsive to the movement of the antenna (213). The control signal (511 and/or 412) comprise a hookswitch control signal (511) and/or a power on/off control signal (412). Operating modes of the radiotelephone (200) may be enabled or disabled responsive to the hookswitch control signal (511). The hookswitch control signal (511) or on/off control signal (412) may also be produced by activation of keys on the radiotelephone's keypad (205). The apparatus and method provides convenient user operation, protection from accidental activation of exposed control keys and reduced cost, weight and thickness for the communication device.

100 Claims, 11 Drawing Sheets

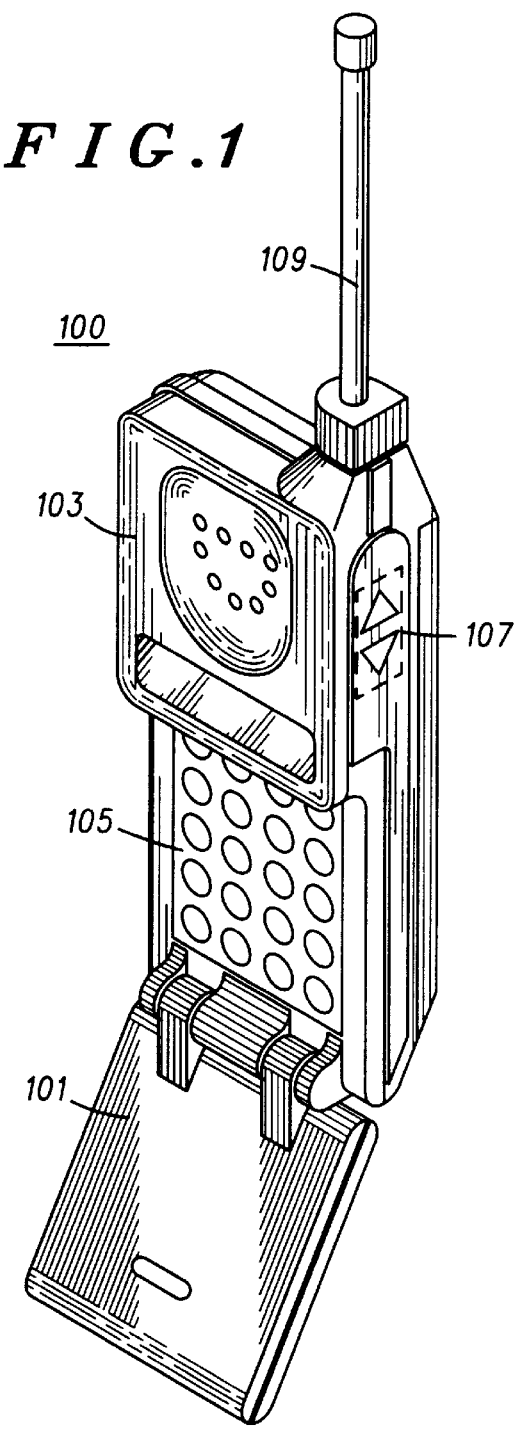
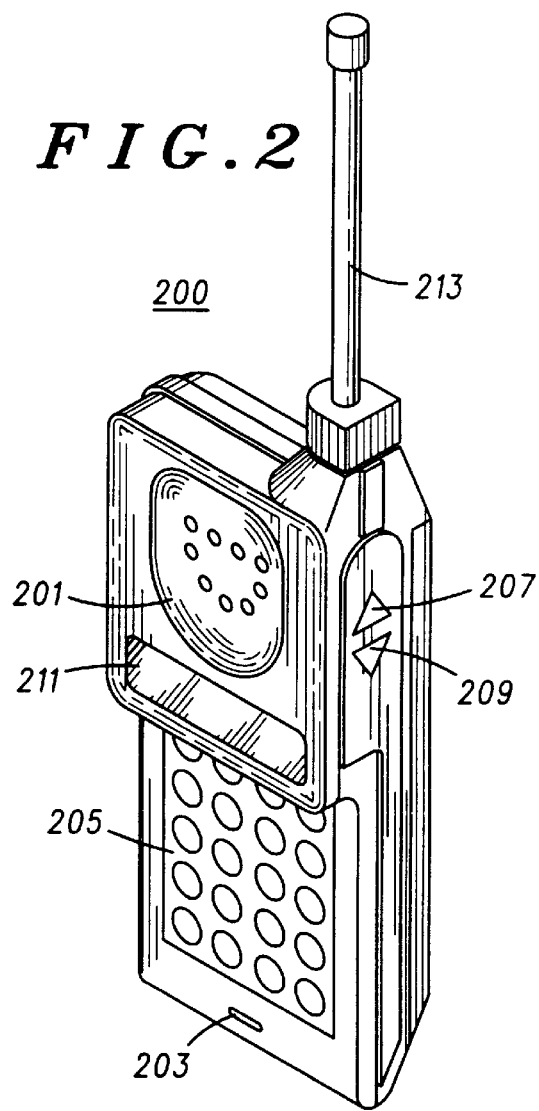
— PRIOR ART —

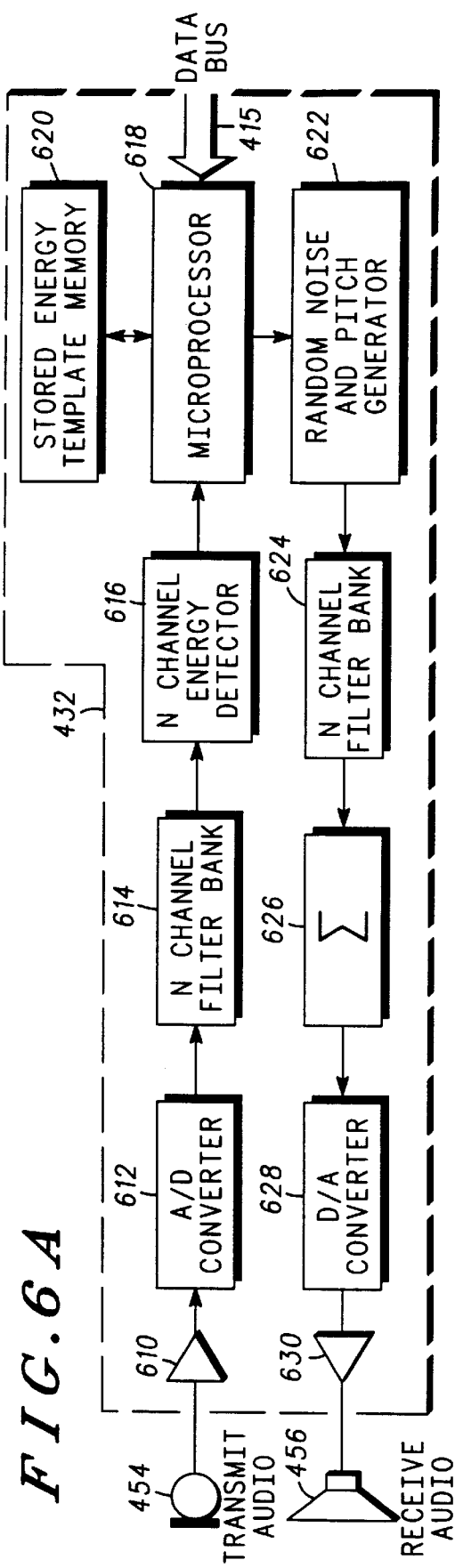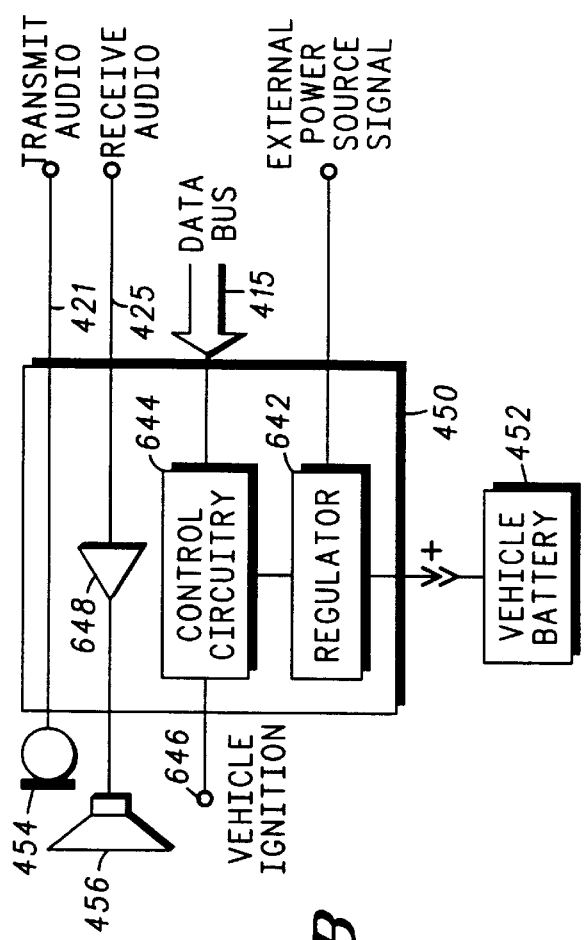
FIG. 6A
FIG. 6B

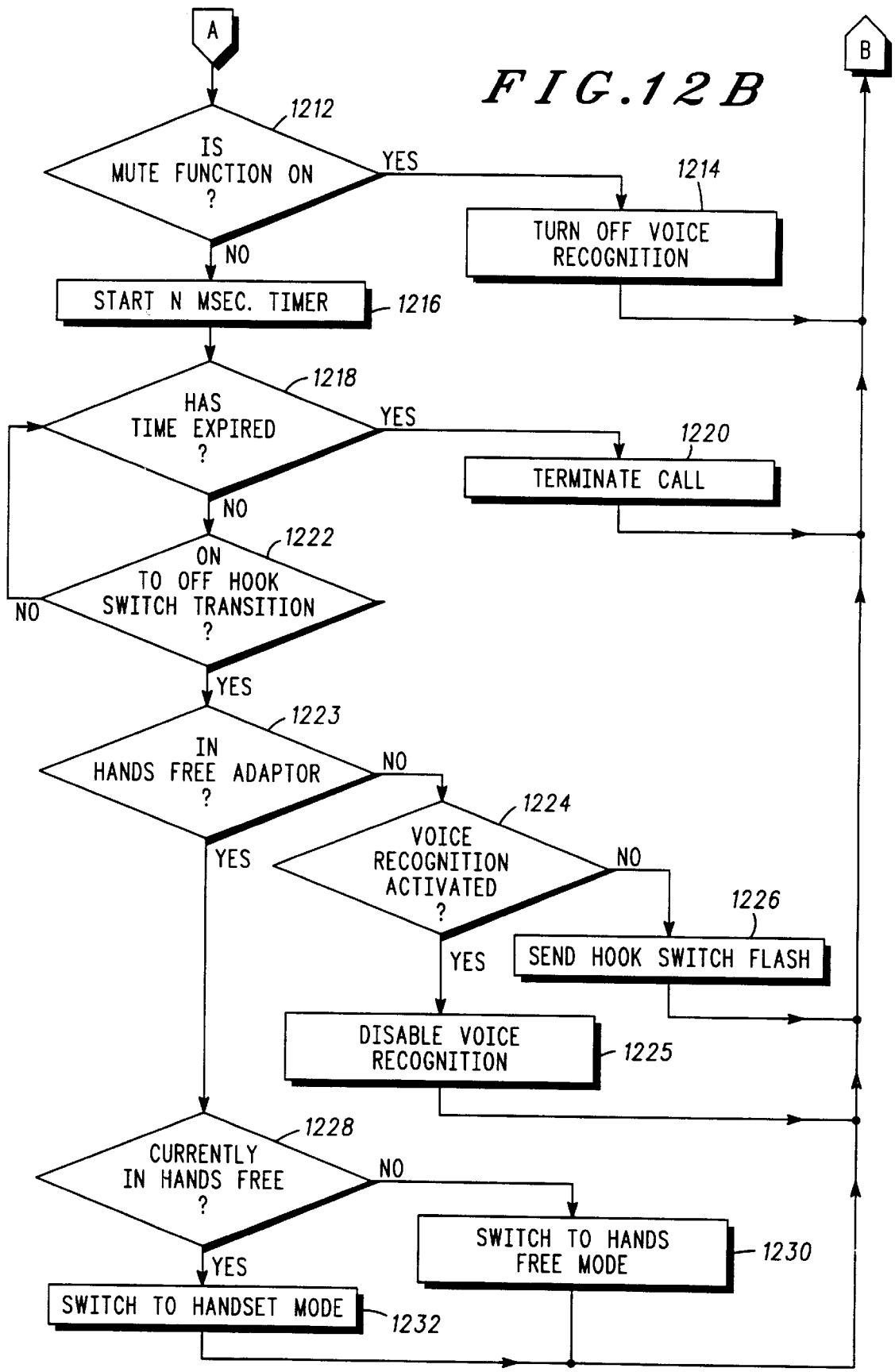

5,898,933

APPARATUS AND METHOD FOR GENERATING A CONTROL SIGNAL RESPONSIVE TO A MOVABLE ANTENNA

FIELD OF THE INVENTION

The present invention relates generally to wireless communication apparatus, and more particularly to a radiotelephone utilizing a moveable antenna to generate a control signal.

BACKGROUND OF THE INVENTION

A wireless communication device, of which a cellular radiotelephone portable subscriber unit is a convenient example, provides an appropriate setting for describing the need for the present invention. The small size of portable radiotelephones enables the user to conveniently carry and store the unit virtually anywhere. This portability, however, allows the portable radiotelephone to be placed in locations where foreign objects may come in contact with a user interface mechanism and inadvertently enable or disable control functions of the radiotelephone. Such undesirable actuation of the control functions is likely to engage related functions which reduce the operating life of a storage battery which powers the portable radiotelephone and may inhibit normal operation.

Some manufacturers offer foldable portable radiotelephones having a housing portion 101 hinged to the body portion 103 of the portable radiotelephone 100 as shown in FIG. 1. Operation of such a portable radiotelephone has been described in U.S. patent application No. 267,156 entitled "Multipurpose Hinge Apparatus" filed in behalf of Beutler et. al. and assigned to the assignee of present invention. The housing portion 101 covers the user interface mechanism 105 when the radiotelephone is not in use and exposes the user interface mechanism when the radiotelephone is in use. To use the portable radiotelephone 100, the user opens the hinged housing portion 101, depresses an "on/off" key on the user interface mechanism 105 to turn the radiotelephone "on" and extends the antenna 109 for optimal wireless communication performance. Disposed on a side of the portable radiotelephone 100 are volume control buttons 107 which may adjust the volume of electroacoustic transducers within the portable radiotelephone 100. To store the portable radiotelephone 100, the user retracts the antenna 109, depresses the "on/off" key to turn the radiotelephone "off" and closes the hinged housing portion 101. The housing portion 101, covering the user interface mechanism 105, offers some protection from accidental control function actuation when the portable radiotelephone 100 is not in use.

In addition to the housing portion covering the user interface mechanism, some manufacturers have taken additional steps to disable control functions when the portable radiotelephone is not in use in the event that small objects such as coins or paper clips should become trapped between the housing portion and the user interface mechanism. A hookswitch, integrated within the portable radiotelephone, senses the position of the housing portion relative to the body portion and may enable or disable control functions responsive to the position of the housing portion relative to the body portion. U.S. Pat. No. 4,845,772 entitled "Portable Radiotelephone With Control Switch Disabling", filed in behalf of Metroka et. al. and assigned to the assignee of the present invention describes a portable radiotelephone which disables an on/off switch under the housing portion and transducer volume level controls 107 on the side of the portable radiotelephone when the portable radiotelephone is not in use. U.S. patent application No. 439,993 entitled "Communications Device With Voice Recognition And Moveable Element Control Interface", filed in behalf of Metroka et. al. on Nov. 20, 1989 describes a portable radiotelephone which deactivates a voice recognition circuit and couples electroacoustic transducers to the portable radiotelephone when the portable radiotelephone is not in use. A cordless telephone manufactured by the Panasonic Company distinguished by model number KXT3000 disables the dialling, number recall, and call processing functions when the housing portion covers the dialling keypad.

The position of the housing portion may also be used to enable control functions of the portable radiotelephone. U.S. patent application No. 439,983 entitled "Communications Device With Moveable Element Control Interface", filed in behalf of Metroka et. al. on Nov. 20, 1989 describes a portable radiotelephone which activates illumination of a keypad, enables a display and a hands free function when the housing portion is opened to expose the user interface mechanism.

Priority goals for portable radiotelephone designs include reducing the radiotelephone's cost, weight and thickness. These goals have been accomplished partly by eliminating the housing portion hinged to the body portion of the portable radiotelephone. Consequently, many of the aforementioned advantages offered by sensing the position of the housing portion relative to the body portion are no longer available and the problems that once plagued portable radiotelephones with exposed user interface mechanisms have resurfaced. Additionally, the hookswitch function, previously performed by positioning the hinged housing portion relative to the body portion, now requires a manual keystroke operation. Manufactures have attempted to compensate for the exposed user interface mechanism by positioning the top surface of individual keys flush with the surrounding housing surface of the body portion. Although this approach eliminates accidental actuation of the keys by large objects, small objects approximately the size of a human finger or smaller may still cause accidental actuation. Additionally, some users having large finger tips complain that the flush keys are difficult to use. Furthermore, accidental actuation is much harder to prevent on radiotelephones having a membrane type user interface mechanism wherein the individual keys are relatively flat and joined to one another without a bordering housing portion to isolate and protect each individual key. Accidental actuation of a membrane type user interface mechanism is usually deterred by including a housing portion that is slightly higher than the mechanism's highest surface and bordering the periphery of the entire keypad.

For may situations, of which cellular portable radiotelephones is merely an example, the prior art has not produced an apparatus or method of generating a control signal to meet the difficult requirement of enabling or disabling control functions at the appropriate time, subject to accidental activation via the exposed user interface mechanism, while providing for the advantage of reduced cost, weight and thickness.

SUMMARY OF THE INVENTION

The present invention encompasses an apparatus and method for a wireless communication device, wherein a moveable wireless communication element coupled to the wireless communication device provides wireless communication in a first position and a second position relative to the wireless communication device. A control signal is generated responsive to the wireless communication element being moved between the first position and the second position. A predetermined operating mode of the wireless communication device is controlled responsive to the control signal. The apparatus and method provides convenient user operation, protection from accidental activation of an exposed user interface mechanism and reduced cost, weight and thickness for the communication device.

BRIEF DESCRIPTION OF THE DRAWINGS

FIG. 1 is an isometric drawing of a typical portable radiotelephone.

FIG. 2 is an isometric drawing of a portable radiotelephone which may employ the present invention.

FIGS. 6A and 6B are block diagrams of voice recognition circuitry and vehicular adaptor (hands-free) circuitry, respectively, employed in FIG. 4.

FIGS. 12A and 12B are a flowchart depicting the process of interpreting hookswitch operation of the master microcomputer of FIG. 4.

DETAILED DESCRIPTION OF A PREFERRED EMBODIMENT

Figure 3A:
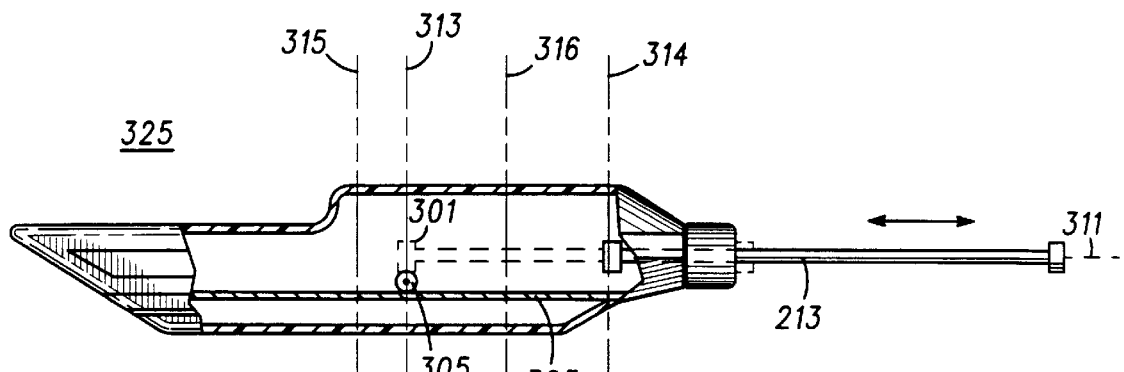
FIGS. 3A–3C are side views of the portable radiotelephone of FIG. 2 having a cut-away view showing a first, second, and third embodiment, respectively, of the the radiotelephone of FIG. 2.

A portable radiotelephone 200 adapted for use in a cellular radiotelephone system is shown in FIG. 2. The user may listen via the earpiece 201 and may speak into the microphone 203. The keypad 205 consists of a plurality of buttons numbered one through zero, # and * in a familiar telephone arrangement as well as additional function buttons such as "send", "end", "clear", "function", "on/off" and other buttons associated with memory recall. Disposed on a side of the portable radiotelephone are two volume control buttons: volume increase 207 and volume decrease 209, which may adjust the volume of the earpiece and/or the ringer. A display 211, disposed above the keypad 205, provides visual feedback for the buttons depressed and other operational features. A wireless communication element, for example antenna 213, provides wireless transceiving communications between the the portable radiotelephone 200 and the cellular radiotelephone system. Note that to reduce the cost, weight and thickness of the portable radiotelephone 200, a hinged housing portion 101 used by the typical portable radiotelephone 100 of FIG. 1 is not attached to the radiotelephone 200 of FIG. 2.

As in typical wireless communication devices, the antenna 213 is be extended when the portable radiotelephone 200 is in use and retracted when the portable radiotelephone 200 is not in use. However, in addition to positioning the radiotelephone's antenna 213 for transceiving communication signals, a novel feature of the radiotelephone 200 comprises enabling or disabling a predetermined operating mode of the radiotelephone 200 responsive to the antenna's position while providing for the advantage of reduced cost, weight and thickness. The predetermined operating mode is a particular functioning arrangement or condition of the radiotelephone such as the radiotelephone's 200 power on or off state, voice recognition's on or off state, or functions implemented responsive to a key depression.

Figure 3B:
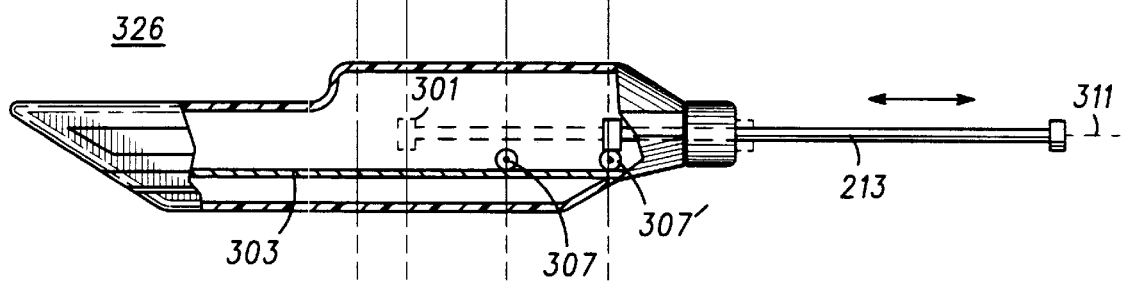
Figure 3C:
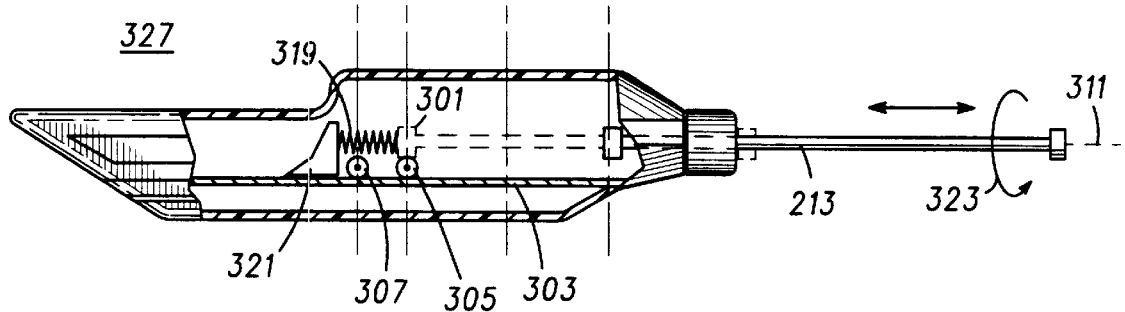

FIGS. 3A–3C illustrate a side view of a first 325, second 326 and third 327 embodiment, respectively, of the portable radiotelephone 200 of FIG. 2. A cut-away portion exposing a cross sectional view in FIGS. 3A–3C illustrate unique switching mechanisms for implementing alternatives of the present invention. In the preferred embodiments 325–327 the antenna 213 may be perceived to extend (solid line) substantially outside the radiotelephone 200 or retract (dotted line) substantially inside the radiotelephone 200 along a center axis 311 of the antenna 213. A first, second, third and fourth position of the antenna 213 inside the radiotelephone 200 are referenced to datum lines at 313–316, respectively. The first position at 313 represents the position of a retracted antenna. The second position at 314 represents the position of an extended antenna. The third position at 315 represents the position of a retracted antenna further retracted into the radiotelephone 200 than the first position at 313. The fourth position at 316 represents the position of the antenna between the first and the second position, for example, approximately half way between the retracted position at 313 and the extended position at 314 of the antenna 213.

The preferred embodiments 325–327 utilize conventional reed switches 305 and 307 electrically coupled to a printed circuit board 303 and a magnet 301 affixed to an end portion of the antenna 213 inside the radiotelephone 200. A magnetic field given off by the magnet 301 causes the reed switches 305 or 307 to close, i.e., short circuit, when placed in close proximity to one of the reed switches and to open circuit when displaced from one of the reed switches. The reed switches 305 and 307 are coupled to the radiotelephone circuitry which takes appropriate action responsive to the open or closed state of the reed switches 305 or 307.

Figure 5:
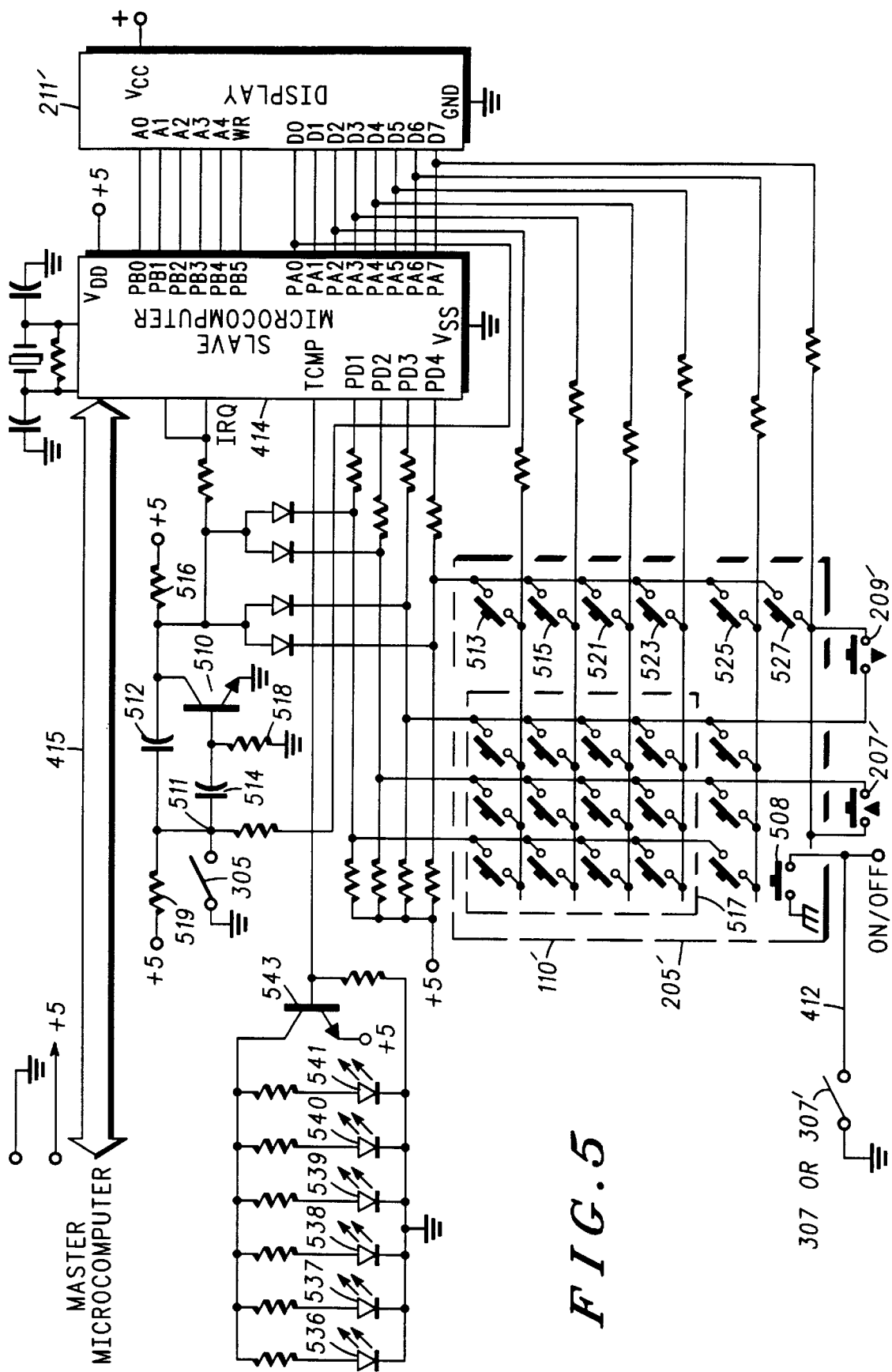
FIG. 5 is a schematic diagram of a slave microcomputer and associated circuitry employed in the portable radiotelephone of FIG. 4.

Referring now to FIG. 3A one may appreciate the advantages of the first preferred embodiment of the present invention wherein a hookswitch control signal (at line 511 in FIG. 5) is generated responsive to the antenna's position. Once a typical portable radiotelephone is turned "on" by conventionally depressing the "on/off" key on the keypad 205, answering, terminating or readying a telephone call requires a key depression or rotating the aforementioned hinged housing portion to generate the hookswitch control signal. Additionally, the antenna is typically extended during use for optimal wireless communication performance and retracted when not in use. In the first preferred embodiment, however, the hookswitch control signal at line 511 of FIG. 5 is generated responsive to the position of the antenna 213 relative to the portable radiotelephone 325 thus eliminating the key depression or rotation of the hinged housing portion to generate the hookswitch control signal at line 511 of FIG. 5. This feature of the radiotelephone 325 provides the user greater convenience in operating the radiotelephone. The user may answer a telephone call by simply extending the antenna 213. Extending the antenna 213 may also ready the portable radiotelephone to make a call. Such a state of answering or readiness to make a call is commonly know as "off-hook". To make a call, the user enters the appropriate phone number through the keypad and depresses the "send" button to activate the portable radiotelephone's transmitter thereby initiating communication with the cellular radiotelephone system. In the first preferred embodiment, the "send" key 513 (FIG. 5) may also be used to answer a telephone call if the antenna is already extended. The user may terminate the telephone call by retracting the antenna 213. Such a retracted state of the antenna is commonly known as "on-hook". In the first preferred embodiment, the "end" key 515 (FIG. 5) may also be used to terminate a telephone call if the antenna is already extended.

In FIG. 3A, one may perceive the generation of the hookswitch control signal at line 511 of FIG. 5 responsive the antenna 213 being moved between the retracted position at 313 and the extended position at 314. An "on-hook" control signal is generated when the antenna 213 is retracted substantially inside the portable radiotelephone 325 to the first position at 313 such that the magnet 301 on the end portion of the antenna 213 is in close proximity with the reed switch 305. The magnetic field given off by the magnet 301 causes the reed switch 305 to short circuit thereby placing the radiotelephone 325 in the "on-hook" state. Extending the antenna 213 substantially outside the portable radiotelephone 325 to the second position at 314 displaces the magnetic field given off by the magnet 301 from the reed switch 305 causing the reed switch 305 to open circuit placing thereby placing radiotelephone 325 in the "off-hook" state. In the first preferred embodiment, the combination of the magnet 301 and the reed switch 305 coupled to the printed circuit board 303 may be known as the hookswitch. In the first preferred embodiment, the antenna 213 has at least two positions relative to the radiotelephone 325 in order to generate both the "on-hook" and "off-hook" operating modes.

To generate the "on-hook" and "off-hook" operating modes without positioning the antenna 213, the user may also conventionally depress the "end" 515 and "send" 513 keys, respectively, on the keypad 205. Similar radiotelephone devices, such as conventional cordless radiotelephones, have a dedicated switch to produce the "on-hook" and "off-hook" operating modes. In the first preferred embodiment, the "on-hook" and "off-hook" operating modes are produced by actuating the "send" 513 or "end" 515 keys on the keypad 205 or by moving the antenna 213 to provide optimum user convenience and functionality for the radiotelephone if the antenna should become inoperable. Table 1 describes the "on-hook" and "off-hook" operating modes produced by actuating the "send" 513 or "end" 515 keys or by moving the antenna 213 after the radiotelephone 325 is already turned "on". The "end" and "send" key depression may place the radiotelephone in an "on-hook" or "off-hook" state, respectively. The antenna position may be extended (out) outside the radiotelephone, or retracted (in) within the radiotelephone. Extending the antenna 213 places the radiotelephone 325 "off-hook" regardless of whether the radiotelephone 325 was placed in the "on-hook" or "off-hook" by a key depression. Similarly, retracting the antenna 213 places the radiotelephone 325 in the "on-hook" state regardless of whether the radiotelephone 325 was placed in the "on-hook" state or in the "off-hook" state by a key depression.

TABLE 1

| Hookswitch state after the key depression. | Antenna movement. | Hookswitch state after the antenna movement. |
|---|---|---|
| on-hook | in to out | off-hook |
| off-hook | in to out | off-hook |
| on-hook | out to in | on-hook |
| off-hook | out to in | on-hook |

Determining the hookswitch state responsive to the position of the antenna not only simplifies operation of the portable radiotelephone for the user but also allows certain control functions to be advantageously enabled or disabled at the appropriate time. Control functions related to the mode of operation of the portable radiotelephone 325 may be disabled to prevent accidental operation when the antenna 213 is in its retracted position at 313, i.e., when the portable radiotelephone 325 is not in use, and may be enabled when the antenna 213 is in its extended position at 314, i.e., when the portable radiotelephone 325 is in use. For example, when the portable radiotelephone 325 is in its standby condition, i.e., turned "on" but in a low power mode to conserve battery power while awaiting a telephone call, it would be undesirable to have the previously described foreign object inadvertently turn the radiotelephone 325 off or initiate a battery power draining function such as a key depression. Therefore, retracting the antenna 213 on the portable radiotelephone 200 may disable user interface controls, either on the keypad 205 or on other peripheral surfaces of the radiotelephone 325, such as the "on/off" 508, number dialling 517, volume controls 207' and 209', "send" 513, "end" 515, "clear" 521, "function" 523 and memory store 525 and recall 527 controls. Additionally, a retracted antenna at 313 may disable circuitry such as voice recognition circuitry as shown in FIG. 6A and hands-free circuitry as shown in FIG. 6B. Extending the antenna 213 enables the aforementioned disabled control functions and circuitry as well as keypad illumination 536–541 and display circuitry 211' per FIG. 5.

Referring now to FIG. 3B, an illustration of the second preferred embodiment, one may perceive the generation of the on/off power control signal responsive to the antenna position. In the second preferred embodiment, the user need only extend the antenna 213 and the portable radiotelephone 326 automatically turns "on" thus eliminating both of the previously described typical steps of opening the hinged housing portion and depressing the "on/off" key 508 (FIG. 5). Likewise, to turn "off" the portable radiotelephone 326, the user need only retract the antenna 213 again eliminating both of the previously described typical steps of depressing the "on/off" key 508 and closing the hinged housing portion. In the second preferred embodiment, the "on-hook" and "off-hook" operating modes are generated using a conventional key depression. A further advantage of the second preferred embodiment allows the designer of the portable radiotelephone to eliminate the "on/off" key on the keypad 205 completely thus reducing the cost and surface area of the keypad. Generating the on/off power control signal responsive to the antenna position may be conveniently used with a second-generation cordless telephone service called CT-2. One feature of the CT-2 cordless telephone is that it will only allow outgoing calls. Therefore, the user should not have a need to extend the antenna without the intention of making a telephone call, i.e., the cordless telephone must be powered "on".

An on/off power control signal 412 (FIGS. 4 and 5) is generated when the antenna 213 is moved from its retracted position at 313, past the half way position at 316 to its extended position at 314. Generation of the on/off power control signal 412 in the second preferred embodiment occurs when magnet 301 momentarily short circuits the reed switch 307 at the half way position at 316. As the antenna 213 passes the half way position at 316, the magnetic field given off by the magnet 301 comes in close proximity with the reed switch 307 causing the reed switch 307 to momentarily short circuit thereby generating the on/off power control signal 412. The movement of the antenna from the retracted position at 313 through the half way position at 316 to the extended position at 314 causes the reed switch 307 to be momentarily actuated producing the on/off power control signal 412 to turn the radiotelephone "on". The movement of the antenna from the extended position at 314 past the half way position at 316 to the retracted position at 313 causes the reed switch 307 to be momentarily short circuited producing the on/off power control signal 412 to turn the radiotelephone "off". A logic interface circuit in a power controller 410 (FIG. 4) detects the momentary reed switch closure and initiates the steps to turn the portable radiotelephone 326 "on" if previously "off" or "off" if previously "on". Details describing the logic interface circuit may be referenced in U.S. Pat. No. 4,798,975 entitled "High Noise Immunity Input Level Detector With Histeresis", filed in behalf of Walczak et. al. and assigned to the assignee of the present invention. Other logic interface circuits may also be used to detect the momentary reed switch closure.

To conventionally turn "on" or "off" the portable radiotelephone 326 without positioning the antenna 213, the user may also depress the "on/off" key 508 on the keypad 205. In a first alternative to the second preferred embodiment of the present invention, the depression of the "on/off" key 508 or moving the antenna 213 may generate the on/off control signal 412 to provide optimum user convenience and functionality for the radiotelephone if the antenna should become inoperable.

In a second alternative of the second preferred embodiment the radiotelephone 326 utilizes a continuously open or closed switch to determine the on/off power operating mode. For example, cordless radiotelephones do not use a momentary on/off power switch. Conventional cordless radiotelephones have a slide switch which places the radiotelephone in the "on" mode when short circuited and places the radiotelephone in the "off" mode when open circuited. The "on" or "off" mode of a cordless radiotelephone may utilize the present invention by positioning the reed switch 307 at one extreme of the antenna movement. In FIG. 3B the alternative position for the reed switch 307' is shown at position 314. Thus, when the antenna 213 is retracted to 313, the reed switch 307' is open and the radiotelephone 326 is in the "off" operating mode. Likewise, when the antenna is extended to 314, the reed switch 307' is closed and the radiotelephone 326 is in the "on" operating mode.

Referring now to FIG. 3C, an illustration of the third preferred embodiment, one may perceive the generation of both the hookswitch 511 and the on/off power control 412 signals responsive to the antenna position. Depressing the "on/off" key 508 on the keypad 205 to generate a power control signal 412 and the "send" 513 or "end" 515 key on the keypad 205' to produce the hookswitch operating mode are combined with the antenna movement to provide optimum user convenience and radiotelephone functionality should the antenna become inoperable. In the third preferred embodiment, the antenna 213 has at least three positions. The hookswitch control signal 511 is generated responsive to positioning the antenna between the first retracted position at 313 and the second extended position at 314 as previously described in the first preferred embodiment. The on/off power control signal 412 is generated responsive to momentarily positioning the antenna 213 in the third position at 315 also on the axis of the antenna 311.

To power "on" the portable radiotelephone using the antenna 213, the user would momentarily position the antenna in the third position 315 by depressing the exposed portion of the retracted antenna 213 into the radiotelephone. Upon depressing the antenna 213, the end portion of the antenna inside the radiotelephone presses against a spring 319 of nonmagnetic material generating a spring force against the end of the antenna 213 along the antenna axis 311. One end of the spring 319 is attached to a support 321 to fixture the spring 319. The other end of the spring 319, opposite the support 321, extends into free space and may be forced upon by the antenna 213. The force applied by the user overcomes the opposite force returned by the spring 319 so that the magnet 301 moves from its position at 313 in proximity to the reed switch 305 to the position at 315 in proximity to the reed switch 307. The spring 319 completely collapses when the magnet 301 is closest to the reed switch 307 so that the magnet does not move past the reed switch 307. Consequently, the reed switch 305 becomes an open circuit and the reed switch 307 becomes a closed circuit. When the user releases the applied force on the exposed end portion of the antenna, the spring 319 forces the antenna 213 to its normally retracted position at 313 which causes reed switch 307 to become an open circuit and the reed switch 305 to become a short circuit. The antenna may then be positioned to the extended position at 314 or the retracted position at 313 to generate the "off-hook" or "on-hook" states, respectively. The force required by the user to position the antenna in the third position at 315 by compressing the spring 319 is substantially greater than the force required to move the antenna between the retracted 313 and extended 314 positions. Thus, the radiotelephone may not be unintentionally turned "on" or "off" when positioning the antenna to generate the hookswitch signal 511 and may be inhibited from accidental actuation of the on/off control signal 412 produced by positioning the antenna at position 315.

The third preferred embodiment includes the advantages of both the aforementioned first and the second preferred embodiments. The on/off and hookswitch control signals generated by the antenna may also be generated by a key depression giving the user optimal convenience and radiotelephone functionality if the antenna 213 should become inoperable.

An alternative to generating the on/off control signal described in the third preferred embodiment comprises spinning the antenna 213 about the axis 311 of the antenna 213 as shown at 323 instead of depressing the antenna to the third position at 315. Conventional switching mechanisms responsive to a spinning motion about an axis are well know to those skilled in the art and may be employed in this alternative. Axial displacement of the antenna between the retracted and extended positions at 313 and 314 respectively, would continue to generate the hookswitch control signal at 511. The advantage of the spinning movement of the antenna 213 is that, in some user applications, spinning the antenna 213 about its axis 311 would make the antenna 213 substantially more immune to accidental power actuation than depressing the antenna into the radiotelephone 326 along its axis 311 to position 315.

A variety of antenna structures are well known in the art and may be used to implement the present invention so long as the antenna 213 is moveable. Although the preferred embodiment describes an antenna 213 which extends and retracts axially with respect to the portable radiotelephone 200 this should not be a limitation of the present invention for other antenna movements may be used to generate the control signal if so desired. For example, one such antenna movement may comprise rotating the antenna about its point of attachment to the portable radiotelephone such that the antenna folds along side the radiotelephone when not in use and is rotated away from the radiotelephone when in use. Another such antenna movement may comprise spinning the antenna 213 about its axis when the antenna is either extended or retracted. A variety of switching mechanisms are also well known to one skilled in the art and should not be limited to the magnet/reed switch combination as described in the preferred embodiments 325–327. Other such switching mechanisms may comprise microswitches and printed circuit board switches. Mechanisms for positively positioning the antenna 213 in at least one of the two positions are well known to one skilled in the art and may be advantageously implemented in conjunction with the present invention. Although the radiotelephones 200 is capable of transmitting and receiving radio frequency signals, the present invention may also be used with wireless communications devices which only transmit or receive radio frequency signals. Such devices which only receive signals may include conventional AM/FM radios or any receiver utilizing an antenna. Devices which only transmit signals may include remote data input devices.

Figure 4:
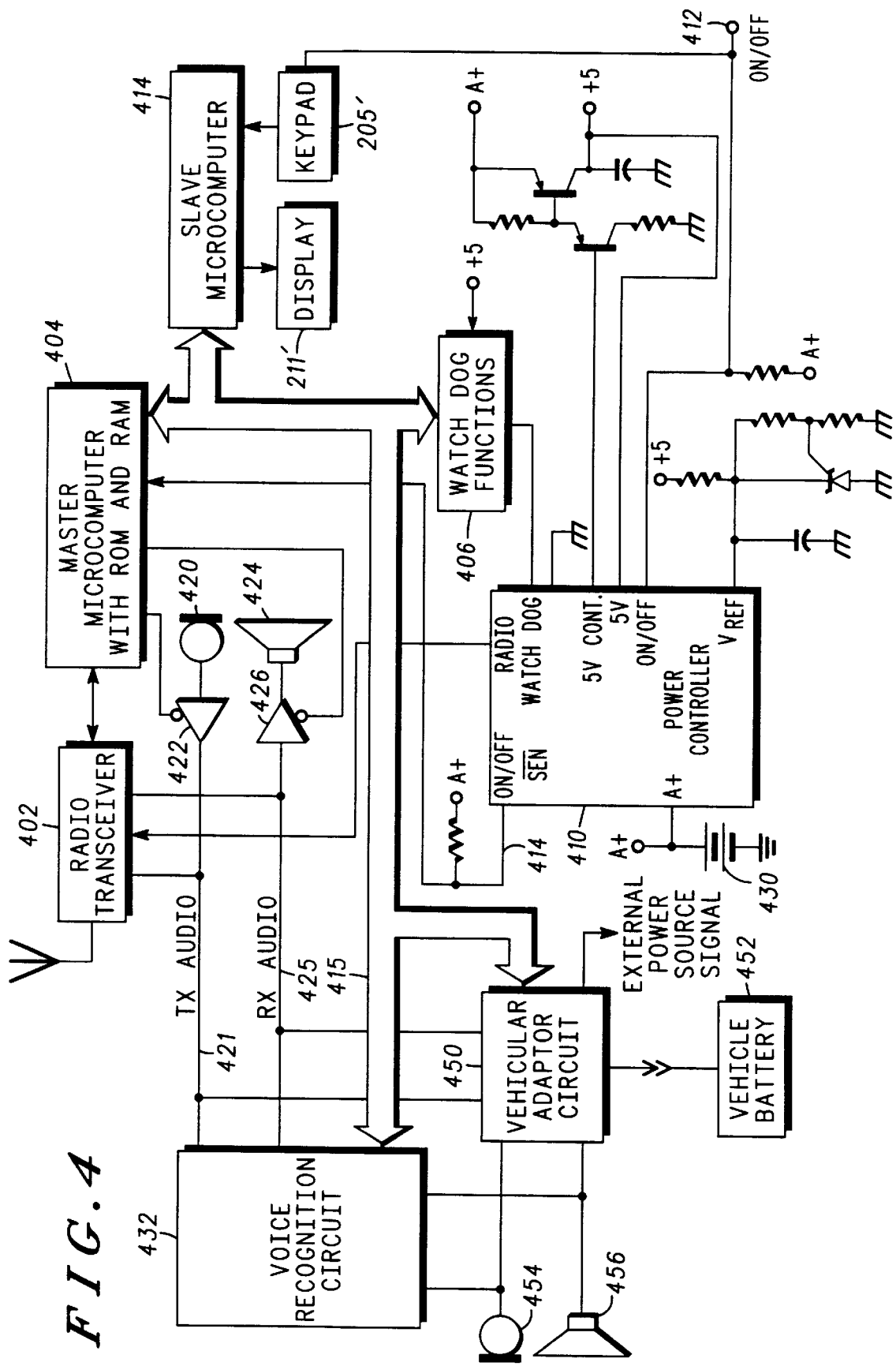
FIG. 4 is a block diagram of the electronic elements of the portable radiotelephone of FIG. 2 embodying the present invention.

Referring to FIG. 4, there is essentially illustrated an electrical block diagram of the cellular portable radiotelephone 200 of FIG. 2 embodying the present invention. Such a portable radiotelephone 200 includes a cellular radiotelephone transceiver 402 operable in cellular radiotelephone systems, internal microphone 420 and switchable amplifier 422, internal speaker 424 and switchable amplifier 426, master microcomputer 404 with conventional RAM (storing pertinent cellular telephone call parameters) and conventional ROM (storing control software), a power controller 410 including regulators coupled to a battery 430 for generating DC (Direct Current) voltages for powering other blocks and coupled to a on/off terminal 412, a slave microcomputer 414 including conventional ROM with controlling software for controlling the display 211' and the keypad 205', a voice recognition circuit 432, a vehicular adapter (hands-free) circuit 450 and watch dog functions 406. External microphone 454, external speaker 456 and a vehicle battery 452 interface with the portable radiotelephone in a vehicular installation. Master microcomputer 404, slave microcomputer 414, voice recognition circuit 432, vehicular adapter (hands-free) circuit 450 and watch dog functions 406 are coupled to and communicate with one another by way of a three-wire data bus 415, which operates as described in U.S. Pat. Nos. 4,369,516 and 4,616,314 (incorporated herein by reference). The foregoing transceiver and microcomputer blocks may be conventional blocks of commercially available portable radiotelephones, such as, for example, the "MICROTAC PT" Cellular Telephone available from Motorola, Inc. The "MICROTAC PT" Cellular Telephone is described in further detail in operator's manual no. 68P81150E49, published and available from Motorola C & E Parts, 1313 E. Algonquin Rd., Schaumburg, Ill. 60196.

Audio signals are converted into electrical signals by the internal microphone 420 and are coupled by switchable amplifier 422 to the radio transceiver 402 via conductor at line 421. These signals are then used to modulate the transmitter of the transceiver 402 in conventional fashion. Likewise, signals received by the receiver of transceiver 402 are coupled via conductor at line 425 to switchable amplifier 426 and subsequently to speaker 424 for conversion to acoustic signals.

When the portable radiotelephone is in the voice recognition mode, the signals from the microphone 420 are coupled by switchable amplifier 422 to voice recognition circuit 432 via the conductor at line 421. Audio signals generated by the voice recognition circuit 432 are coupled via conductor at line 425 for connection to the amplifier 426 and subsequently to the speaker 424.

In the preferred embodiment, two interconnected microcomputer systems are utilized to control the basic functions of the portable radiotelephone (the master microcomputer 404) and to control the keypad and display functions (the slave microcomputer). The slave microcomputer is shown in more detail in the schematic of FIG. 5. The slave microcomputer 414 consists of a microcomputer 414 which, in the preferred embodiment is an MC68HC05C4 microcomputer (which also has on-board memory). The basic function of the slave microcomputer is to provide interface to the user of the portable radiotelephone via keypad 205', display 211', and other buttons, indicators and illumination backlighting. The slave microcomputer 414 is coupled to a multi-segment display 211' which, in the preferred embodiment is a conventional LED 8 digit display. The slave microcomputer 414 is also coupled to a keypad matrix of key switches 205' which enables the portable radiotelephone user to input "dial" telephone numbers 517, store and recall telephone number information and perform other radiotelephone functions (such as initiate or terminate a telephone call). In the preferred embodiments, one of the keys of the matrix 205, 508, is specially dedicated to the function of turning the power "on" and "off". The on/off control is accomplished by a momentary switch closure by key 508 to ground which activates on/off circuitry. Volume increase switch 207' and volume decrease switch 209' are electrically coupled to the slave microcomputer 414 as part of the row/column matrix. Their physical location is away from the keypad 205' on a peripheral surface of the radiotelephone 200 as shown in FIG. 2 to allow for greater user convenience. Additional keys such as the "send" 513, "end" 515, "clear" 521, "function" 523 and memory "store" 525 and "recall" keys an also provided for typical radiotelephone operation.

The on/off function normally performed by the on/off switch 508 on the keypad 205' may also be performed using the switch 307 shown schematically in FIG. 5. A direct current circuit is made or broken by the switch 307 to ground and applied to the on/off line at 412 as an input to the power controller 410.

The function which is normally performed by a hookswitch in a conventional landline telephone is performed in the portable radiotelephone of the present invention as previously described in relation to FIG. 3. The hookswitch is shown schematically as switch 305 in FIG. 5. A DC (Direct Current) circuit is made or broken by the hookswitch 305 to ground and applied to the microcomputer 414 via the hookswitch control signal at line 511. Furthermore, a pulse is generated from any change of state of the hookswitch 305 by a transistor 510, capacitors 512 and 514 and resistors 516, 518, and 519. The output of the transistor 510 is taken from the collector and applied to the interrupt request (IRQ) input and the keypad column inputs of microcomputer 414 having a negative duration of approximately 10 microseconds.

Slave microprocessor 414 stores the status of the hookswitch 305 and provides an indication of the change of state of the hookswitch 305 to the master microcomputer 404.

Communication between the slave microcomputer 414 and the master microcomputer 404 is maintained on a data bus 415. This data bus 415 is coupled to the master microcomputer 404 as shown in FIG. 4. Other functions also share the data bus 415 including the voice recognition circuit 432 and the vehicular adapter circuit 415. Assuming that the portable radiotelephone has been turned "on", a keypad 205' depression by the portable radiotelephone user results in a communication between the slave microcomputer 414 and the master microcomputer 404 via the bus 415. The slave microcomputer 414 in the preferred embodiment communicates that a closure has occurred between a particular row and a particular column corresponding to the key pressed by the user. The master microcomputer 404 may then take appropriate action such as returning a digit instruction via the bus 415 for the slave microcomputer 414 to cause the display 211 to illuminate or otherwise display a character. Thus, the slave microcomputer 414 is commanded by the master microcomputer 404 or the user in order to complete an assignment.

Illumination for the keypad 205' is provided, in the preferred embodiments, by a plurality of light emitting diodes (LEDs) indicated by diodes 536 through 541 in FIG. 5. LEDs 536 through 541 are conventionally supplied from a regulated 5 volt voltage source via current limiting resistors and switch transistor 543. Switch transistor 543 is coupled to the TCMP port of the slave microcomputer 414 and is enabled/disabled in accordance with the stored program of the slave processor 414. The LEDs are physically mounted behind the keypad 205 shown in FIG. 2 and provide backlighting to the keys to aid the user in selecting the keys in dim lighting conditions.

Referring now to FIG. 6A, there is illustrated a block diagram of a voice recognition circuit 432 which may be utilized in the present invention. When the voice recognition circuits are activated, microphone audio from an external microphone 454 is coupled to amplifier 610 where the gain is increased to an appropriate input level for the A/D converter 612 and to a transmit (TX) audio path 421. The A/D converter 612 digitizes the amplified analog input signal from the amplifier 610. The digitized signal from the A/D converter 612 is fed into a filter bank 614 comprised of 'n' bandpass filters whose responses overlap at the 3 dB response points. The output from each of the filter bank channels is fed to an 'n' channel energy detector 616 where the amplitude of the signal in each bandpass response is detected. The detected level from each energy detector, at 616, is fed to a conventional microcomputer 618 for comparison with a stored energy template from memory 620. Upon successful correlation of the microphone input with the stored template, microcomputer 618 sends a command on the data bus 415 to the master microcomputer 404. In this manner, a command such as a telephone number to be dialed or a "send" or "end" command may be entered to control radiotelephone operation. Synthesized voice replies from the voice recognition circuits are initiated by the microcomputer 618 by sending control signals to a random noise generator and pitch generator circuit 622. Signals from these generators are fed to an 'n' channel filter bank 624 which comprises 'n' narrow bandpass filters. The output of these filters are added together in a summer block 626 whose output is fed to a D/A converter 628 where the digital signal is converted to an analog signal. The analog signal is amplified to an appropriate level with amplifier 630 and sent to the receive (RX) audio path 425 which is then sent to the external speaker 456 so that the user will hear the synthesized voice responses. The voice recognition circuits may be activated by the master microcomputer 404 by sending commands to the voice recognition processor 618 over the data bus 415. Similar voice recognition circuits are further disclosed in U.S. Pat. Nos. 4,797,929; 4,817,157; 4,870,686; 4,896,361; 4,945,570; U.S. patent application No. 266,293 ("Word Spotting In a Speech Recognition System Without Predetermined End Point Detection", filed on behalf of Gerson on Oct. 31, 1988) and international publication numbers WO 87/07748 and WO 87/07749 (Dec. 17, 1987).

Referring to 6B there is shown a block diagram of a hands-free vehicular adapter circuit which may be employed in the present invention. The vehicular adapter 450 may be a hands-free adapter with a regulated power supply which couples the portable radiotelephone to a vehicle battery 452. When coupled to duplex hands-free adapter (DHFA) the portable radiotelephone is in the DHFA mode, in which, inter alia, display 211' is disabled when the portable radiotelephone is inactive for a period of time.

Master microcomputer 404 detects the presence of an external power source by monitoring an external power source signal from the vehicular adapter circuit 450. The external power source signal is converted to a binary signal have a binary state indicating whether or not the external power source is present (i.e., binary 0 state equals external power source present).

If the portable telephone is in the DHFA mode, audio amplifiers 422 and 426 are disabled and the TX audio at 421 and RX audio at 425 are routed to the hands-free circuitry of the vehicular adapter circuit 450 for processing and coupling to the hands-free microphone 454 and speaker 456, respectively, as shown in FIG. 6B.

The portable cellular radiotelephone receives its power via the external power source connection which is the output of conventional voltage regulator 642. The voltage supplied by the vehicle battery 452 is voltage regulated and controlled by voltage regulator 642. Control circuitry 644 turns the regulator output on and off in response to signals from the vehicle ignition input at port 646 and data bus 415. Data bus 415 is used by the portable radiotelephone to sense if a hands-free adapter 450 is plugged into the portable radiotelephone. RX audio signal at 425 from the portable radiotelephone is coupled to the amplifier 648 in hands-free adapter 450 to boost the level to drive speaker 456. The output from microphone 454 is connected to the portable radiotelephone via TX audio connection at 421.

Although the preferred embodiments have been implemented employing two microcomputers, this should not be a limitation of the invention for it is possible to implement the present invention in a single microcomputer should the designer so desire. For a single microcomputer or a multiple microcomputer system the microcomputers may be interrupt driven in order to save battery power.

Figure 7:
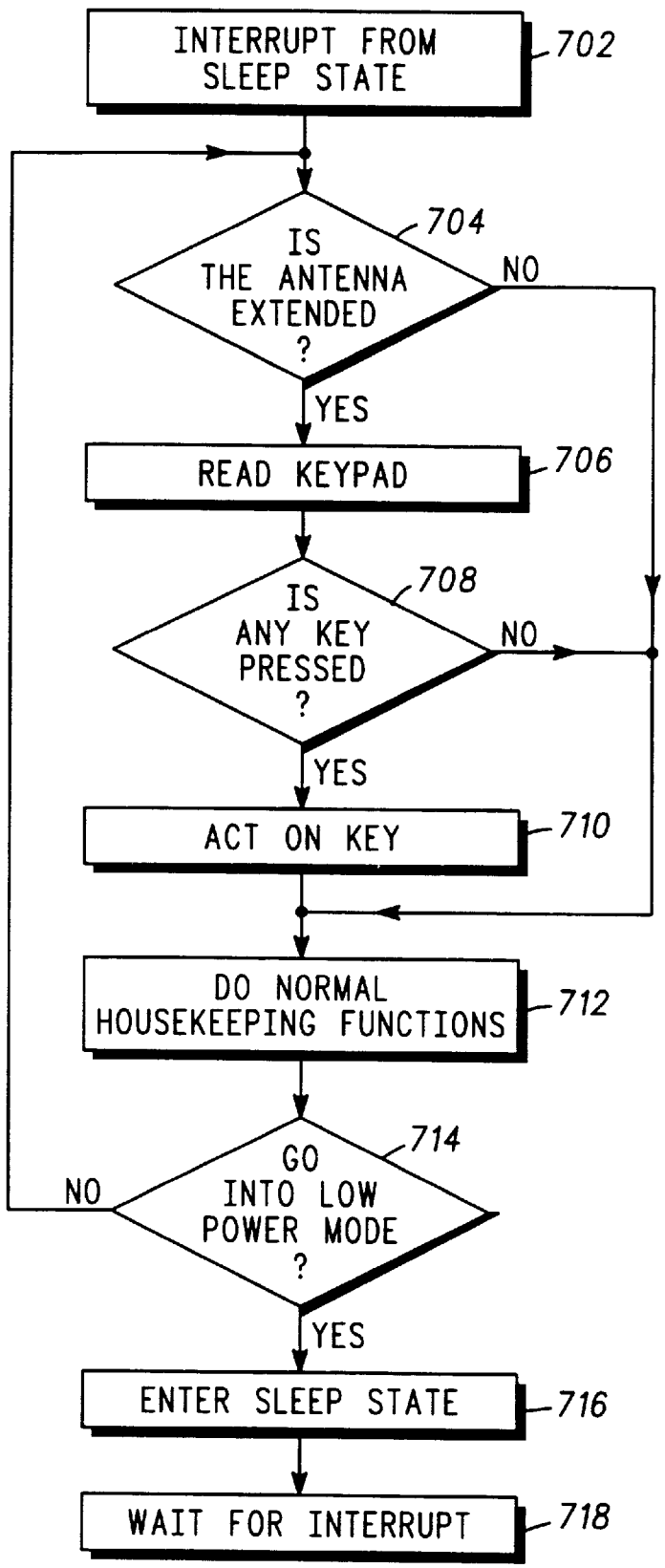
FIG. 7 is a flowchart depicting the deactivation process employed in the slave microcomputer of FIG. 5.

FIGS. 7 through 12B represent the processes followed to realize the preferred embodiments 325 and 327 of the present invention which generate a hookswitch signal responsive to the antenna position. Referring now to FIG. 7, processes followed by the slave microcomputer 414 in realizing the present invention are illustrated in flowchart form. The process of FIG. 7, therefore, commences with an interrupt due to a change of state of the hookswitch 305 to enable the microcomputer system at 702. A determination is made, at 704, whether the antenna is extended or retracted. If the antenna is extended, then the keypad 110 is read to determine which key has been closed at 706. If a key has been depressed, at 708, then the function or character designated by the key is acted upon at 710. If a keypad key has not been depressed, then no action is taken and the microcomputer system resumes its normal functions of controlling the transceiver, the display, and other housekeeping chores as shown at 712. If it is determined that the antenna is retracted at 704, then any keypad key depression is considered to be spurious and is ignored by progressing directly from the determination block at 704 to the normal housekeeping functions block at 712. The entire process is repeated for a predetermined period of time until a determination is made that the microcomputer system should go into a low power consumption mode as determined at 714. The microcomputer system is put into a "sleep" state at 716 and only the low power functions await for an interrupt signal at 718.

Figure 8:
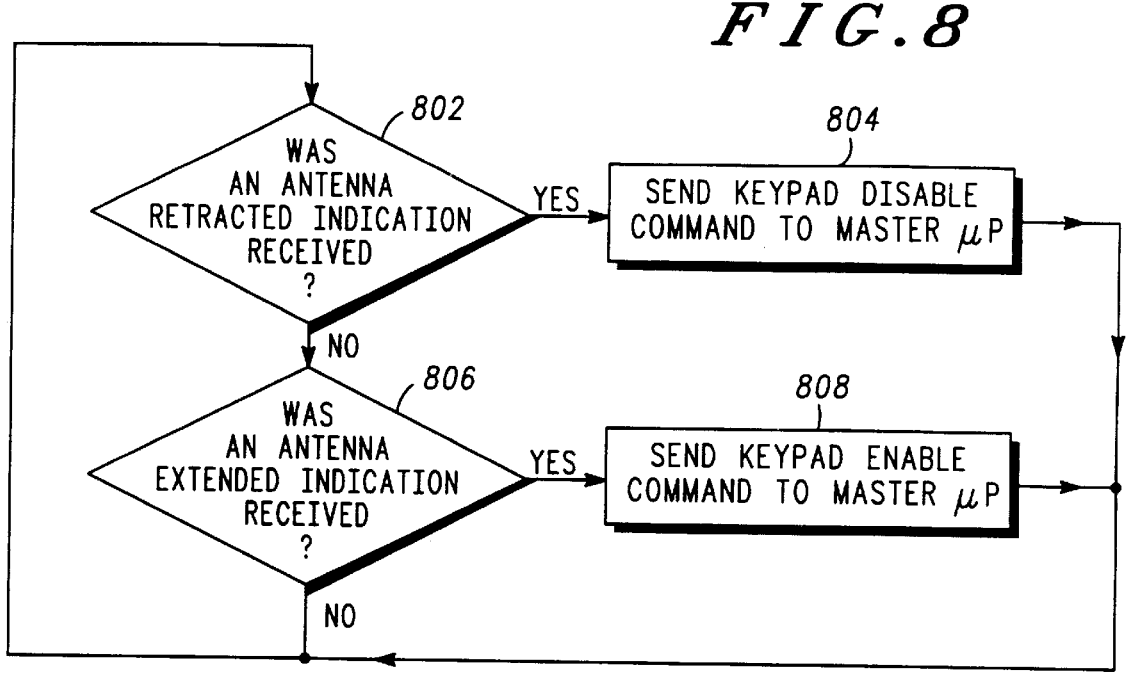
FIG. 8 is a flowchart depicting the process of activation/deactivation employed in the master microcomputer of FIG. 4.

If the microcomputer system is implemented as a master and a slave microcomputer, the master microcomputer utilizes the process shown in FIG. 8 (as part of its standard operating procedure) to prevent spurious key depressions from activating the portable radiotelephone. Since the slave microcomputer 402 can send either an antenna extended indication or an antenna retracted indication, a detection of those indications is necessary by the master microcomputer. A test is made, at 802, of whether the antenna retracted indication has been received from the slave microcomputer 414 on the bus 415. If an antenna retracted indication is received, then the master microcomputer 404 sends a keypad disable command at 804, to the slave microcomputer 414 on the bus 415. The master microcomputer 404 then returns to its programmed routine of chores. If an antenna retracted indication is not received, at 802, then a test is made of whether an antenna extended indication has been received from the slave microcomputer 414, at 806. If such an indication has been received by the master microcomputer 404, then a command is sent to the slave microcomputer 414 on the bus 415 to enable the slave microcomputer 414 to again read any keypad button depressions and to send such information to the master microcomputer 404. Upon completion of the enable command, the master microcomputer 404 returns to its routine chores.

Figure 9A:
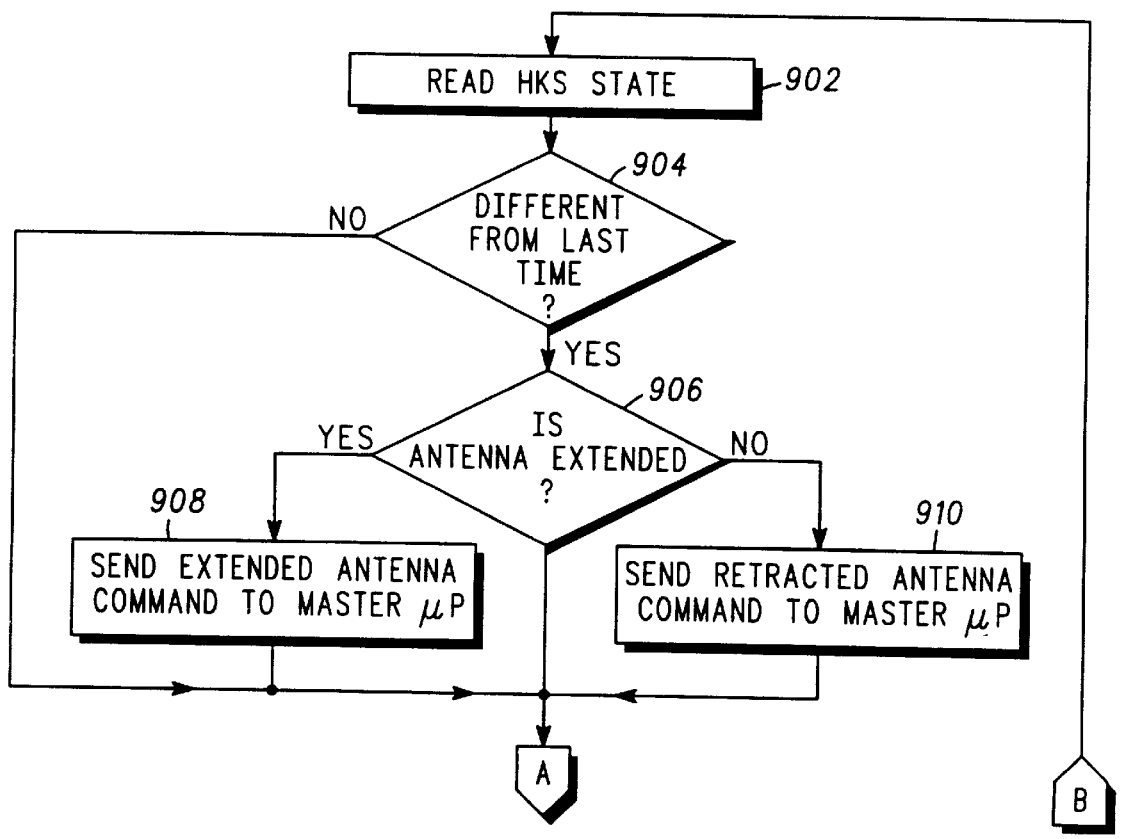
FIGS. 9A and 9B, combined, are flowcharts depicting the process of activation/deactivation employed in the slave microcomputer of FIG. 5.
Figure 9B:
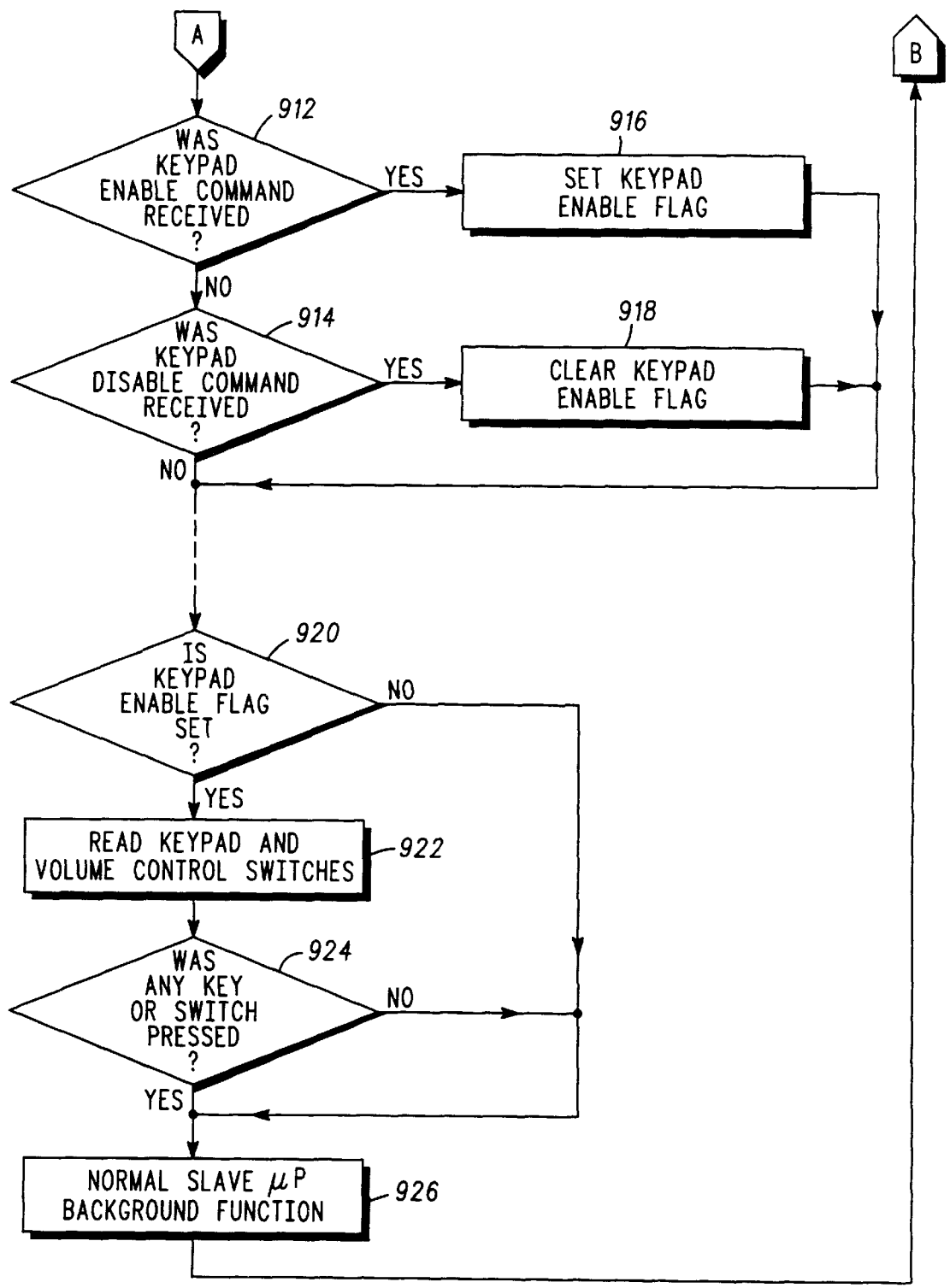
Figure 10:
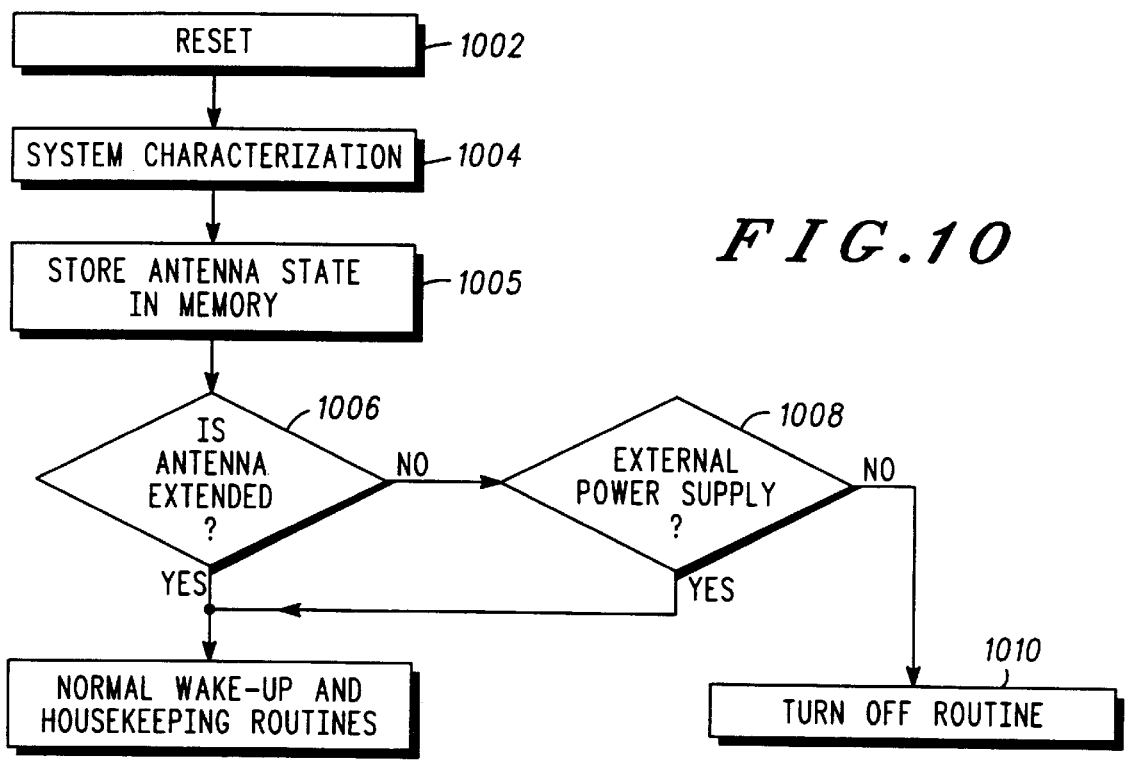
FIG. 10 is a flowchart depicting the process of activation/deactivation of the power on/off switch upon initial power-up of the master microcomputer of FIG. 4.
Figure 11:
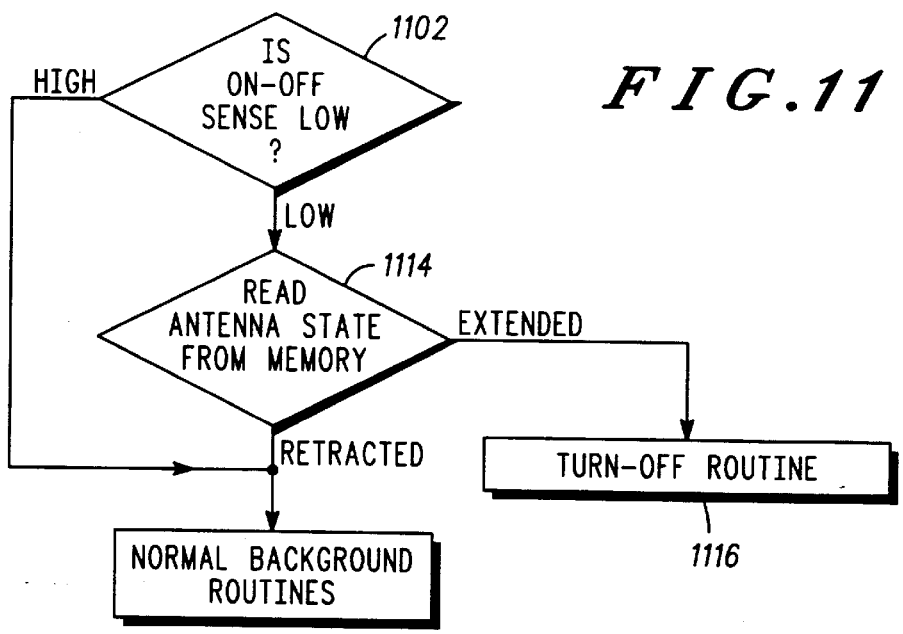
FIG. 11 is a flowchart depicting the process of activation/deactivation of the power on/off switch after initial power-up of the master microcomputer of FIG. 4.

The process followed by the slave microcomputer 414 in realizing the present invention in the preferred embodiment is shown in FIGS. 9A and 9B. The slave microcomputer 414 memorizes the state of the hookswitch 305 corresponding to whether the antenna is extended or retracted. The slave microcomputer 414 determines as part of its routine of chores, whether the hookswitch 305 has changed state by comparing the current state against the stored state at 902 and 904. If the state is different, then a determination is made, at 906 whether the antenna is extended or retracted. If the antenna is determined to be extended, then an extended antenna command (off-hook) is transmitted to the master microcomputer at 908. If the determination is made at 906 yields a retracted antenna, then a retracted antenna command (on-hook) is conveyed to the master microcomputer at 910. In either case the master microcomputer 404 always maintains the antenna state in its associated storage. The slave microcomputer, as part of its routine of chores, checks for a keypad enable or keypad disable command received from the master microcomputer 404. This determination is made at decision blocks 912 and 914. A keypad enable command sets a keypad enable flag in the slave microcomputer 414 memory at 916, while a keypad disable command clears the keypad enable flag at 918 before the process of FIGS. 9A and 9B resumes its normal background flow. Further along the normal background process the slave microcomputer 414 reads the keypad enable flag, at 920, and reads the row and column lines from the keypads in addition to the volume increase switch 207 and the volume decrease switch 209, at 922, to determine if any key or switch has been depressed, at 924. If a key or switch has been depressed, then an identification of the key or switch depression is sent to the master microcomputer at 926. The process of FIGS. 9A and 9B then returns to the normal slave microcomputer background functions at 926. Thus, if the antenna is determined to be extended, then the keys of the keypad and the volume increase and decrease switches are read in conventional fashion. If the antenna is determined to be retracted then the keys of the keypad and volume increase and decrease switches are ignored.

The "on/off" key 508 is also exposed and prone to accidental actuation. In the preferred embodiment, the on/off key is placed among the matrix of keypad keys for aesthetic reasons. It is a desirable feature that once the power is turned on, the portable transceiver remains in a power-on mode and not be turned off due to a spurious on/off key depression when the antenna is retracted. Likewise, when the portable transceiver is turned off, it is equally desirable that the portable transceiver remain in the powered-off condition even though a spurious on/off key depression may occur when the antenna is retracted. Two processes enable this operation. Depression of the on/off key is ignored when the antenna is retracted. Referring again to FIG. 4, when a momentary depression of the on/off switch 508 occurs, a ground signal is applied to the on/off line at 412 into the power controller 410 of FIG. 4. The ground signal is buffered by power controller 410 and applied to the master microcomputer 404 via line 414. Upon receipt of this buffered on/off signal on line 414, the master microcomputer 404 follows the process flow charted in FIG. 10. The master microcomputer 404 and the rest of the associated microcomputer system undergoes a reset operation at 1002 and requests a system characterization (a definition of what peripherals exist on the bus) at 1004. As part of the characterization process, the slave microcomputer 414 reports the state of the antenna. The current antenna state is then stored, at 1005. The master microcomputer then determines if the antenna is extended, at 1006. If this determination is positive, then the master microcomputer proceeds with its normal wake-up and house keeping routines. If the antenna is determined to be retracted at 1006, then a check is made to determine if an external supply has been connected to the portable radiotelephone at 1008. Such a circuitry sharing arrangement is further described in U.S. patent application No. 107,227 ("Radio Arrangement Having Two Radios Sharing Circuitry", filed on behalf of Michael P. Metroka, on Oct. 9, 1987). If an external supply is determined to exist at 1008, then the master microcomputer 404 returns to its normal housekeeping routines. If the external supply is not connected, then a power turn-off routine is followed at 1010. Power turn-off is accomplished by the master microcomputer 404 by storing its status and other essential parameters in memory before allowing the watchdog functions 406 of FIG. 4 to run out. A watch dog power function run out is communicated to the power controller 410 which subsequently turns off the portable radiotelephone.

Once the master microcomputer 404 has successfully powered up any on/off switch depressions are ignored so as long as the antenna is retracted. A determination of the signal sense on line 414 of FIG. 4 is made by the master microcomputer 404 at 1102 of FIG. 11. If the sense is signal high, then the master microcomputer continues with its background routines. If the sense is low, then the master microcomputer reads the status of the antenna state in storage at 1114 and either proceeds with a turn off routine at 1116 if the antenna is extended or ignores a depression of the on/off switch as a spurious depression if the antenna is retracted. Thus, a valid on/off command may be processed only if the antenna is extended.

Figure 12A:
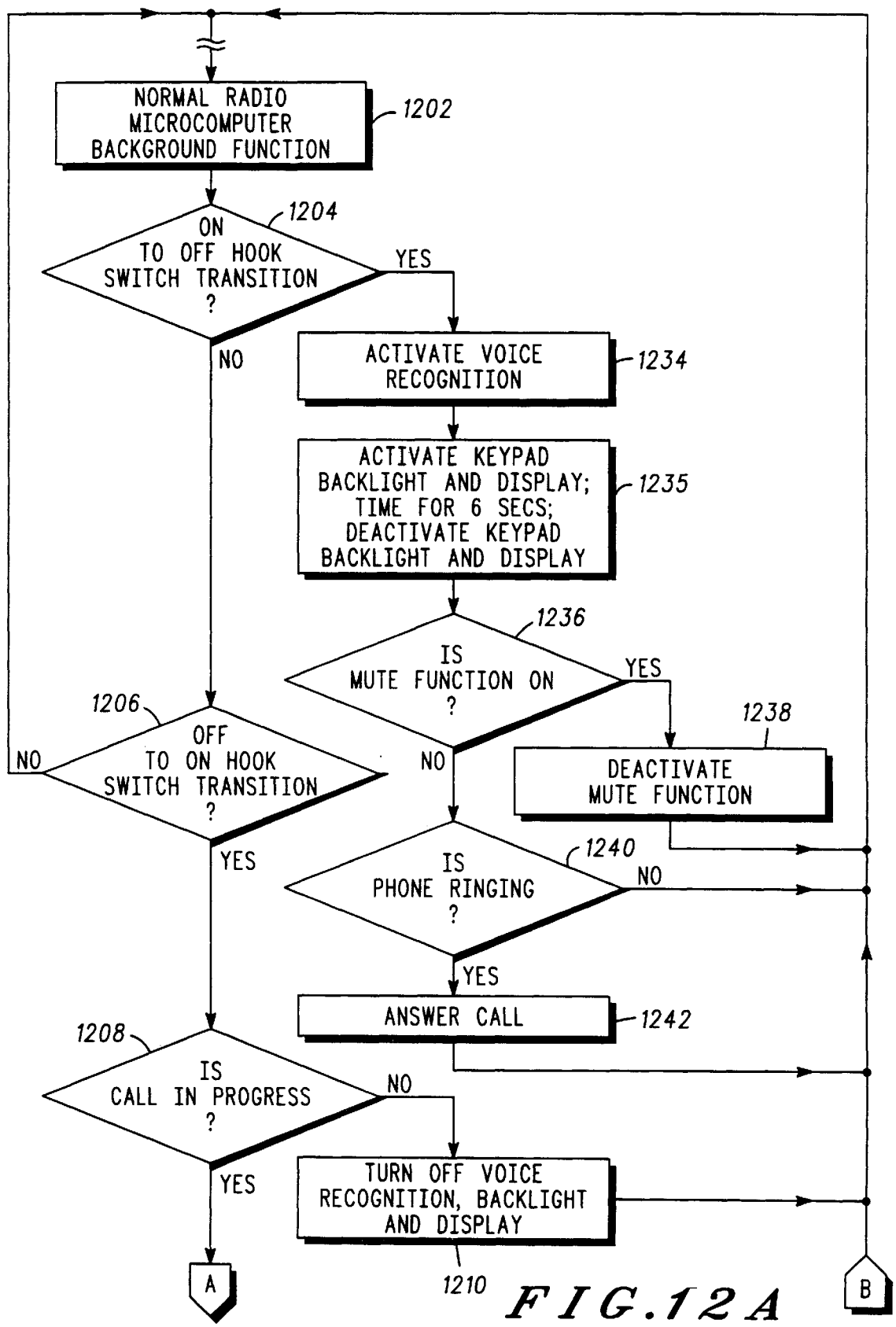

The process followed by the master microcomputer 404 in realizing the present invention in the preferred embodiment 325 and 327 is shown in FIGS. 12A and 12B. The master microcomputer 404, as part of its routine of chores, at 1202, checks for an on-hook to off-hook transition at 1204. If an on-hook to off-hook transition has not occurred then flow proceeds to determination block 1206 where a test is made to determine if an off-hook to on-hook transition has occurred. If none has occurred, then flow returns to the normal background functions at 1202. If it is determined that an off-hook to on-hook transition has occurred at 1206 indicating that the antenna 213 is in the retracted position, then flow proceeds to determination block 1208 where a test is made to determine if a telephone call is presently in progress. If it is determined that a call is not presently in progress, then flow proceeds to 1210 where the voice recognition circuitry is disabled, the backlighting is inactivated, and the display is inactivated. Thus, if the antenna 213 is retracted while a call is not in progress, then the voice recognition circuitry, the backlighting, and the display are inactivated. Optionally, the display may remain actuated for a period of six seconds before being deactivated by such an off-hook to on-hook transition. From 1210, flow returns to the normal background functions at 1202. If a determination is made that a call was in process, at 1208, then flow proceeds to determination block 1212. A test is made at 1212, of whether the microphone mute function is on. If the microphone is muted, then flow proceeds to 1214 where the voice recognition circuitry is disabled. Thus, when the antenna 213 is retracted while a call is in progress and the microphone is muted, the voice recognition circuitry is disabled. Flow proceeds from block 1214 to 1202 where flow returns to normal background functions. If it is determined, at 1212, that the microphone is not muted, then flow proceeds to block 1216 where a timer of 'n' milliseconds is started. This timer runs until it has either expired or the antenna is extended. After the counter is started, flow proceeds to determination block 1218 where a test is made to determine whether the timer has expired. If the timer has expired then the flow proceeds to block 1220 where the telephone call is terminated. Thus, if the antenna is retracted for longer than 'n' milliseconds while a call is in progress and the microphone is not muted, then the call is terminated. In the preferred embodiments, the timer duration 'n' is 1000 milliseconds. Flow proceeds to determination block 1222 where a test is made of whether an on-hook to off-hook transition has occurred. If no on-hook to off-hook transition has occurred, then flow returns to determination block 1218. Flow continues in the 1218–222 loop until either the timer expires or an on-hook to off-hook transition occurs. If a determination is made, at 1222, that an on-hook to off-hook transition has occurred prior to the timer expiring, then flow proceeds to determination block 1223. A test is made, at 1223, of whether the telephone is coupled to the hands-free vehicular adaptor circuit 450. One such vehicular adaptor circuit which may be employed by the present invention is a S1747A available from Motorola, Inc. If the telephone is not coupled to the vehicular adaptor 450 then flow proceeds to a decision block 1224, where a determination of whether the voice recognition circuit has been enabled. If the voice recognition circuit has been enabled, it is then disabled, at block 1225, before the process returns to the normal background functions at 1202. If the voice recognition circuit is not enabled at this time, then the process proceeds to block 1226 where a hookswitch flash signal is sent. Optionally, a hookswitch flash signal may be sent if the "send" key on the keypad is depressed. Thus, if the portable radiotelephone is coupled to the hands free vehicular adaptor 450 and is engaged in a telephone call when the hands-free circuit of the vehicular adaptor is enabled, the momentary retraction and extension of the antenna (in less than 'n' msec.) deactivates the hands-free function and the portable radiotelephone reverts to the use of the internal microphone and speaker. Likewise, if the portable radiotelephone is coupled to the hands-free adaptor 450 and engaged in a telephone call with the hands-free circuit disabled, the momentary retraction and extension of the antenna results in the activation of the hands-free circuit. If the portable radiotelephone is not coupled to the hands-free vehicular adaptor 450 and is presently in a call with the microphone not muted where the antenna is momentarily retracted and then extended prior to the timer expiring, then either the voice recognition circuit is disabled or a hookswitch flash signal is sent. From 1226, flow returns to the normal background functions at 1202.

If a determination is made, at 1223, that the telephone was in the hands-free vehicular adaptor, then the process flow continues to determination block 1228. A test is made at 1228, to determine whether the telephone is currently in the handsfree mode. If it is determined, at 1228, that the telephone is not in the hands-free mode, then the process flow proceeds to block 1230 where the mode is set to the hands-free mode. In the hands-free mode, the internal microphone 420 and speaker 424 are inactivated and the external microphone 454 and external speaker 456 are active. Thus if the portable radiotelephone is in the hands-free vehicle adaptor 450 and is presently in a call with the microphone not muted while the antenna is momentarily retracted and then extended prior to the timer expiring but is not in the hands-free mode at the time, then the mode is changed from a private call with the radiotelephone's internal microphone and speaker to the hands-free mode using the external microphone and speaker. From 1230, flow returns to the normal background functions at 1202. If it is determined, at 1228, that the portable radiotelephone was in the hands-free mode then the flow proceeds to block 1232 where the mode is changed from the hands-free mode to a private call using the radiotelephone's internal microphone and speaker. Thus if the portable radiotelephone is in the hands-free vehicular adaptor 450 and is presently in a call with either microphone not muted while the antenna 213 is momentarily retracted and then extended prior to the timer expiring and the radiotelephone is in the hands-free mode at the time, then the mode is changed from the hands-free mode to that of a private call using the radiotelephone's internal microphone 420 and speaker 424. From 1232, flow returns to the normal background functions at 1202.

If it is determined, at 1204, that an on-hook to off-hook transition occurred then the flow proceeds to block 1234 where the voice recognition circuitry 432 is activated. The process then, at 1235, activates the keypad backlighting illumination and the display 211 for a conventionally timed period of six seconds. Thus, if the master microcomputer 404 is performing normal background functions and an on-hook to off-hook transition occurs, then the voice recognition circuitry is activated, the keypad backlighting is activated, the display is activated. The flow continues to determination block 1236. A test is made, at 1236, to determine whether the microphone mute function is on. If it is determined, at 1236, that the microphone is muted, then flow proceeds to block 1238, where the microphone is unmuted. Thus, if the microphone is in the muted state with the antenna 213 retracted, extending the antenna will unmute the microphone, from 1238 flow returns to the normal background functions 1202.

If it is determined, at 1236, that the microphone was not muted, then flow proceeds to determination block 1240. A test is made, at 1240, to determine whether the portable radiotelephone is currently ringing. If it is determined, at 1240, that the portable radiotelephone is not ringing, indicating that there is no incoming call, then the process flow returns to the normal background functions at 1202. If it is determined, at 1240, that the radiotelephone is ringing, then the process flow proceeds to block 1242 where the incoming call is answered. Thus, if the portable radiotelephone is ringing while the antenna 213 is retracted an the antenna 213 is extended, the incoming call is answered. From 1242, flow returns to the normal background functions at 1202.

Thus, a portable radiotelephone having the capability of enabling and disabling hands-free circuitry, voice recognition circuitry, user interface control inputs, number display and keypad illumination in response to the position of an antenna has been shown and described.

What is claimed is:

1. A wireless communication device comprising:
   a housing;
   communication circuitry disposed in the housing;
   an antenna coupled to an elongated antenna housing having a length dimension substantially greater than a width dimension, moveable between first and second positions relative to the housing, and coupled to the communication circuitry when the antenna is moved to at least one of the first and second positions;
   a detector, coupled to the antenna, for detecting the movement of the antenna between the first and second positions, wherein movement of the antenna causes the detector to be in a first state when the antenna is moved to the first position and causes the detector to be in a second state when the antenna is moved to the second position; and
   a controller, coupled to the detector and the communication circuitry, for placing the communication circuitry in on-hook and off-hook states responsive to the detector being in the first state and the second state, respectively.

2. A wireless communication device in accordance with claim 1 wherein the controller enables if disabled and disables if enabled a predetermined operating mode of the wireless communication device responsive to the off-hook and on-hook states, respectively.

3. A wireless communication device in accordance with claim 1 further comprising means for generating a hookswitch control signal responsive to the antenna being moved between the first and second positions.

4. A wireless communication device in accordance with claim 1 wherein the wireless communication device includes a user interface mechanism, the wireless communication device further comprises means for generating the on-hook and off-hook states responsive to actuation of at least a portion of the user interface mechanism.

5. A wireless communication device in accordance with claim 1 wherein the first and second positions of the antenna further comprise an axially retracted position wherein the antenna is substantially inside the housing, and an axially extended position wherein the antenna is substantially outside the housing, respectively.

6. A wireless communication device in accordance with claim 1 wherein the detector generates a hookswitch flash control signal responsive to the antenna being moved from the second position to the first position then back to the second position within a predetermined time period thereby causing the controller to place the communication circuitry in the off-hook state, then in the on-hook state and then back in the off-hook state within the predetermined period of time, respectively.

7. A wireless communication device in accordance with claim 1 further comprising a character display, wherein the controller enables and disables the character display responsive to the off-hook and on-hook states, respectively, of the wireless communication device.

8. A wireless communication device in accordance with claim 1 further comprising a keypad with a keypad illumination means, wherein the controller enables and disables the keypad illumination means responsive to the off-hook and on-hook states, respectively, of the wireless communication device.

9. A wireless communication device in accordance with claim 1 further comprising a hands-free apparatus, wherein the controller enables and disables the hands-free apparatus responsive to the off-hook and on-hook states, respectively, of the wireless communication device.

10. A wireless communication device in accordance with claim 1 further comprising a switchable power source, wherein the controller enables and disables the switchable power source responsive to the off-hook and on-hook states, respectively, of the wireless communication device.

11. A wireless communication device in accordance with claim 1 further comprising an acoustic transducer, and means for adjusting the acoustic volume of the acoustic transducer wherein the controller enables and disables the means for adjusting the acoustic volume of an acoustic transducer responsive to the off-hook and on-hook states, respectively, of the wireless communication device.

12. A wireless communication device in accordance with claim 1 further comprising a voice recognition apparatus, wherein the controller enables and disables the voice recognition apparatus responsive to the off-hook and on-hook states, respectively, of the wireless communication device.

13. A wireless communication device in accordance with claim 1 further comprising number dialing and call processing keys, wherein the controller enables and disables the number dialing and call processing keys responsive to the off-hook and on-hook states, respectively, of the wireless communication device.

14. A wireless communication device in accordance with claim 1 further comprising a user interface mechanism for controlling operation of the wireless communication device, wherein the controller enables and disables the user interface mechanism responsive to the off-hook and on-hook states, respectively, of the wireless communication device.

15. A wireless communication device comprising
   a housing;
   communication circuitry disposed in the housing;
   an antenna moveable between first and second positions relative to the housing, and coupled to the communications circuitry when the antenna is moved to at least one of the first and second positions;
   a detector, coupled to the antenna for detecting the movement of the antenna between the first and second positions, wherein movement of the antenna causes the detector to be in a first state when the antenna is moved to the first position and causes the detector to be in a second state when the antenna is moved to the second position; and a controller, coupled to the detector and the communication circuitry, for placing the communication circuitry in power-off and power-on states responsive to the detector being in the first state and the second state, respectively.

16. A wireless communication device in accordance with claim 15 wherein the first and second positions of the antenna further comprise an axially retracted position wherein the antenna is substantially inside the housing and an axially extended position wherein the antenna is substantially outside the housing, respectively.

17. A wireless communication device in accordance with claim 15 further comprising means for generating a power on/off control signal responsive to the antenna being moved between the first and second positions.

18. A wireless communication device in accordance with claim 15 wherein the wireless communication device includes a user interface mechanism, the wireless communication device further comprises means for generating the power-on and power-off states responsive to actuation of at least a portion of the user interface mechanism.

19. A wireless communication device comprising:

a housing;

communication circuitry disposed in the housing;

an antenna moveable between first, second and third positions relative to the housing, and coupled to the communications circuitry when the antenna is moved to at least one of the first, second and third positions;

a first detector, coupled to the antenna, for detecting movement of the antenna between the first position and the second position, wherein movement of the antenna causes the first detector to generate a hookswitch control signal responsive to the antenna being moved between the first position and the second position;

a second detector, coupled to the antenna, for detecting movement of the antenna between the first position and the third position, wherein movement of the antenna causes the second detector to generate a power on/off control signal responsive to the antenna being moved between the first position and the third position; and a controller, coupled to the detector and the communication circuitry, for placing the communication circuitry in on-hook and off-hook states responsive to the hookswitch control signal, and for placing the communication circuitry in power-off and power-on states responsive to the power on/off control signal.

20. A wireless communication device in accordance with claim 19 wherein the first position, the second position and the third position of the antenna further comprise a first axially retracted position wherein the antenna is substantially inside the housing, an axially extended position wherein the antenna is substantially outside the housing, and a second axially retracted position being further retracted inside the housing than the first axially retracted position, respectively.

21. A wireless communication device in accordance with claim 19 wherein the first position, the second position and the third position of the further comprise an axially retracted position wherein the antenna is substantially inside the housing, an axially extended position wherein the antenna is substantially outside the housing and a rotatable position about an axis of the, respectively.

22. A wireless communication device in accordance with claim 19 wherein the wireless communication device includes a user interface mechanism, the wireless communication device further comprises means for generating the power on/off control signal responsive to actuation of at least a portion of the user interface mechanism.

23. A wireless communication device in accordance with claim 19 wherein the wireless communication device includes a user interface mechanism, the wireless communication device further comprises means for generating the hookswitch control signal responsive to actuation of at least a portion of the user interface mechanism.

24. A wireless communication device in accordance with claim 19 further comprising means for forcing the antenna out of the third position such that a switching means is momentarily actuated.

25. A portable radiotelephone comprising:

a transceiver;

an antenna copied to an elongated antenna housing having a length dimension substantially greater than a width dimension, coupled to the transceiver and moveable between a first position and a second position;

a detector, coupled to the antenna, for detecting the movement of the antenna between the first and second positions, wherein movement of the antenna causes the detector to be in a first state when the antenna is moved to the first position and causes the detector to be in a second state when the antenna is moved to the second position; and a controller, coupled to the detector, for producing an on-hook state and an off-hook state when the detector is in the first state and the second state, respectively.

26. A portable radiotelephone comprising:

a transceiver;

an antenna coupled to an elongated antenna housing having a length dimension substantially greater than a width dimension, coupled to the transceiver and moveable between a first position and a second position;

a detector, coupled to the antenna, for detecting the movement of the antenna between the first and second positions, wherein movement of the antenna causes the detector to be in a first state when the antenna is moved to the first position and causes the detector to be in a second state when the antenna is moved to the second position; and a controller, coupled to the detector, for producing a hookswitch control signal when the detector changes between the first state and the second state.

27. A portable radiotelephone comprising:

a transceiver;

an antenna coupled to the transceiver and moveable between a first position and a second position;

a detector, coupled to the antenna, for detecting the movement of the antenna between the first and second positions, wherein movement of the antenna causes the detector to be in a first state when the antenna is moved to the first position and causes the detector to be in a second state when the antenna is moved to the second position; and a controller, coupled to the detector, for producing a power-off state and a power-on state when the detector is in the first state and the second state, respectively.

28. A portable radiotelephone comprising:

a transceiver;

an antenna coupled to the transceiver and moveable between a first position and a second position;

a detector, coupled to the antenna, for detecting the movement of the antenna between the first and second positions, wherein movement of the antenna causes the detector to be in a first state when the antenna is moved to the first position and causes the detector to be in a second state when the antenna is moved to the second position; and a controller, coupled to the detector, for producing a power on/off control signal when the detector changes between the first state and the second state.

29. A portable radiotelephone comprising:

a transceiver;

an antenna coupled to the transceiver and moveable between a first position, a second position, and a third position;

a detector for detecting the movement of the antenna between the first position, second and third positions, wherein movement of the antenna causes the detector to be in a first state when the antenna is moved to the first position, causes the detector to be in a second state when the antenna is moved to the second position, and causes the detector to be in a third state when the antenna is moved to the third position; and a controller, coupled to the detector, for producing a hookswitch control signal when the detector changes between the first state and the second state and a power on/off signal when the detector changes between the first state and the third state.

30. A portable communication device comprising:

an antenna coupled to an elongated antenna housing having a length dimension substantially greater than a width dimension, and moveable between a first position and a second position;

a first sensor for sensing when the antenna is in the first position and when the antenna is in the second position, wherein movement of the antenna to the first position causes the first sensor to sense that the antenna is in the first position, and wherein movement of the antenna to the second position causes the first sensor to sense that the antenna is in the second position; and a controller for placing the portable communication device in an on-hook state and an off-hook state responsive to the first sensor sensing that the antenna is in the first position and in the second position, respectively.

31. A portable communication device in accordance with claim 30 wherein the first position and the second position comprise a stowed position and an unstowed postition, respectively.

32. A portable communication device in accordance with claim 30 wherein the first position and the second position comprise a first axial position and a second axial postition, respectively, along a longitudinal axis of the antenna.

33. A portable communication device in accordance with claim 30 wherein the first position and the second position comprise a first radial position and a second radial postition, respectively, about a longitudinal axis of the antenna.

34. A portable communication device in accordance with claim 30 wherein the controller enables if disabled and disables if enabled a predetermined operating mode of the portable communication device responsive to the off-hook state and the on-hook state, respectively.

35. A portable communication device in accordance with claim 34 wherein the predetermine operating mode further comprises at least one of the following: a character display, keypad lighting, a hands-free apparatus, a switchable power source, a switch for the volume of an acoustic transducer, a voice recognition apparatus, number dialing and call processing keys, and a user interface mechanism.

36. A portable communication device in accordance with claim 30 wherein the movement of the antenna between the first position and the second position causes the controller to generate a hookswitch control signal.

37. A portable communication device in accordance with claim 30 wherein the detector generates a hookswitch flash control signal responsive to the controller placing the portable communication device in the off-hook state, then in the on-hook state and then back in the off-hook state within a predetermined time period.

38. A portable communication device in accordance with claim 30 wherein the antenna is moveable between a third position and a fourth position, wherein movement of the antenna to the third position causes the controller to place the portable communication device in a power-on state, and wherein movement of the antenna to the fourth position causes the controller to place the portable communication device in a power-off state.

39. A portable communication device in accordance with claim 38 wherein the first position, the second position, the third position and the fourth position of the antenna further comprise a first axial position along a longitudinal axis of the antenna, a second axial position along the longitudinal axis of the antenna, a first radial position about the longitudinal axis of the antenna, and a second radial position about the longitudinal axis of the antenna, respectively.

40. A portable communication device in accordance with claim 30 wherein the portable communication device comprises a radiotelephone.

41. A portable communication device comprising:

a controller for placing the portable communication device in a power-on state and a power-off state; and an antenna being moveable between a first position and an second position, wherein movement of the antenna to the first position causes the controller to place the portable communication device in the power-on state, and wherein movement of the antenna to the second position causes the controller to place the portable communication device in the power-off state.

42. A portable communication device in accordance with claim 41 wherein the first position and the second postition comprise a unstowed position and an stowed postition, respectively.

43. A portable communication device in accordance with claim 41 wherein the first position and the second position comprise a first axial position and a second axial postition, respectively, along a longitudinal axis of the antenna.

44. A portable communication device in accordance with claim 41 wherein the first position and the second position comprise a first radial position and a second radial postition, respectively, about a longitudinal axis of the antenna.

45. A portable communication device in accordance with claim 41 wherein the movement of the antenna between the first position and the second position causes the controller to generate a power on/off control signal.

46. A portable communication device in accordance with claim 41 wherein the antenna is moveable between a third position and a fourth position, wherein movement of the antenna to the third position causes the controller to place the portable communication device in an on-hook state, and wherein movement of the antenna to the fourth position causes the controller to place the portable communication device in an off-hook state.

47. A portable communication device in accordance with claim 46 wherein the first position, the second position, the third position and the fourth position of the antenna further comprise a first radial position about a longitudinal axis of the antenna, a second radial position about the longitudinal axis of the antenna, a first axial position along the longitudinal axis of the antenna, and a second axial position along the longitudinal axis of the antenna, respectively.

48. A portable communication device in accordance with claim 41 wherein the portable communication device comprises a radiotelephone.

49. A wireless communication device comprising:
a housing;
communication circuitry disposed in the housing;
an antenna telescopically moveable between first and second positions relative to the housing, and coupled to the communication circuitry when the antenna is moved to at least one of the first and second positions;
a detector, coupled to the antenna, for detecting the movement of the antenna between the first and second positions, wherein movement of the antenna causes the detector to be in a first state when the antenna is moved to the first position and causes the detector to be in a second state when the antenna is moved to the second position; and
a controller, coupled to the detector and the communication circuitry, for placing the communication circuitry in on-hook and off-hook states responsive to the detector being in the first state and the second state, respectively.

50. A wireless communication device in accordance with claim 49 wherein the controller enables if disabled and disables if enabled a predetermined operating mode of the wireless communication device responsive to the off-hook and on-hook states, respectively.

51. A wireless communication device in accordance with claim 49 wherein the detector generates a hookswitch control signal responsive to the antenna being moved between the first and second positions.

52. A wireless communication device in accordance with claim 49 wherein the wireless communication device includes a user interface mechanism, the wireless communication device further comprises means for generating the on-hook and off-hook states responsive to actuation of at least a portion of the user interface mechanism.

53. A wireless communication device in accordance with claim 49 wherein the first and second positions of the antenna further comprise an axially retracted position wherein the antenna is substantially inside the housing, and an axially extended position wherein the antenna is substantially outside the housing, respectively.

54. A wireless communication device in accordance with claim 49 wherein the detector generates a hookswitch flash control signal responsive to the antenna being moved from the second position to the first position then back to the second position within a predetermined time period thereby causing the controller to place the communication circuitry in the off-hook state, then in the on-hook state and then back in the off-hook state within the predetermined period of time, respectively.

55. A wireless communication device in accordance with claim 49 further comprising a character display, wherein the controller enables and disables the character display responsive to the off-hook and on-hook states, respectively.

56. A wireless communication device in accordance with claim 49 further comprising a keypad with a keypad illumination means, wherein the controller enables and disables the keypad illumination means responsive to the off-hook and on-hook states, respectively.

57. A wireless communication device in accordance with claim 49 further comprising a hands-free apparatus, wherein the controller enables and disables the hands-free apparatus responsive to the off-hook and on-hook states, respectively.

58. A wireless communication device in accordance with claim 49 further comprising a switchable power source, wherein the controller enables and disables the switchable power source responsive to the off-hook and on-hook states, respectively.

59. A wireless communication device in accordance with claim 49 further comprising an acoustic transducer, and means for adjusting the acoustic volume of the acoustic transducer wherein the controller enables and disables the means for adjusting the acoustic volume of an acoustic transducer responsive to the off-hook and on-hook states, respectively.

60. A wireless communication device in accordance with claim 49 further comprising a voice recognition apparatus, wherein the controller enables and disables the voice recognition apparatus responsive to the off-hook and on-hook states, respectively.

61. A wireless communication device in accordance with claim 49 further comprising number dialing and call processing keys, wherein the controller enables and disables the number dialing and call processing keys responsive to the off-hook and on-hook states, respectively.

62. A wireless communication device in accordance with claim 49 further comprising a user interface mechanism for controlling operation of the wireless communication device, wherein the controller enables and disables the user interface mechanism responsive to the off-hook and on-hook states, respectively.

63. A wireless communication device comprising:
a housing;
communication circuitry disposed in the housing;
an antenna telescopically moveable between first and second positions relative to the housing, and coupled to the communications circuitry when the antenna is moved to at least one of the first and second positions;
a detector, coupled to the antenna, for detecting the movement of the antenna between the first and second positions, wherein movement of the antenna causes the detector to be in a first state when the antenna is moved to the first position and causes the detector to be in a second state when the antenna is moved to the second position; and
a controller, coupled to the detector and the communication circuitry, for placing the communication circuitry in power-off and power-on states responsive to the detector being in the first state and the second state, respectively.

64. A wireless communication device in accordance with claim 63 wherein the first and second positions of the antenna further comprise an axially retracted position wherein the antenna is substantially inside the housing and an axially extended position wherein the antenna is substantially outside the housing, respectively.

65. A wireless communication device in accordance with claim 63 wherein the detector generates a power on/off control signal responsive to the antenna being moved between the first and second positions.

66. A wireless communication device in accordance with claim 63 wherein the wireless communication device includes a user interface mechanism, the wireless communication device further comprises means for generating the power-on and power-off states responsive to actuation of at least a portion of the user interface mechanism.

67. A portable radiotelephone comprising:

a transceiver;

an antenna coupled to the transceiver and telescopically moveable between a position and a second position;

a detector, coupled to the antenna, for detecting the movement of the antenna between the first and second positions, wherein movement of the antenna causes the detector to be in a first state when the antenna is moved to the first position and causes the detector to be in a second state when the antenna is moved to the second position; and a controller, coupled to the detector, for producing an on-hook state and an off-hook state when the detector is in the first state and the second state, respectively.

68. A portable radiotelephone comprising:

a transceiver;

an antenna coupled to the transceiver and telescopically moveable between a first position and a second position;

a detector, coupled to the antenna, for detecting the movement of the antenna between the first and second positions, wherein movement of the antenna causes the detector to be in a first state when the antenna is moved to the first position and causes the detector to be in a second state when the antenna is moved to the second position; and a controller, coupled to the detector, for producing a hookswitch control signal when the detector changes between the first state and the second state.

69. A portable radiotelephone comprising:

a transceiver;

an antenna coupled to the transceiver and telescopically moveable between a first position and a second position;

a detector, coupled to the antenna, for detecting the movement of the antenna between the first and second positions, wherein movement of the antenna causes the detector to be in a first state when the antenna is moved to the first position and causes the detector to be in a second state when the antenna is moved to the second position; and a controller, coupled to the detector, for producing a power-off state and a power-on state when the detector is in the first state and the second state, respectively.

70. A portable radiotelephone comprising:

a transceiver;

an antenna coupled to the transceiver and telescopically moveable between a first position and a second position;

a detector, coupled to the antenna, for detecting the movement of the antenna between the first and second positions, wherein movement of the antenna causes the detector to be in a first state when the antenna is moved to the first position and causes the detector to be in a second state when the antenna is moved to the second position; and a controller, coupled to the detector, for producing a power on/off control signal when the detector changes between the first state and the second state.

71. A portable communication device comprising:

an antenna telescopically moveable between a first position and a second position;

a first sensor for sensing when the antenna is in the first position and when the antenna is in the second position, wherein movement of the antenna to the first position causes the first sensor to sense that the antenna is in the first position, and wherein movement of the antenna to the second position causes the first sensor to sense that the antenna is in the second position; and a controller for placing the portable communication device in an on-hook state and an off-hook state responsive to the first sensor sensing that the antenna is in the first position and in the second position, respectively.

72. A portable communication device in accordance with claim 71 wherein the first position and the second position comprise a stowed position and an unstowed postition, respectively.

73. A portable communication device in accordance with claim 71 wherein the first position and the second position comprise a first axial position and a second axial postition, respectively, along a longitudinal axis of the antenna.

74. A portable communication device in accordance with claim 71 wherein the first position and the second position comprise a first radial position and a second radial postition, respectively, about a longitudinal axis of the antenna.

75. A portable communication device in accordance with claim 71 wherein the controller enables if disabled and disables if enabled a predetermined operating mode of the portable communication device responsive to the off-hook state and the on-hook state, respectively.

76. A portable communication device in accordance with claim 75 wherein the predetermine operating mode further comprises at least one of the following: a character display, keypad lighting, a hands-free apparatus, a switchable power source, a switch for the volume of an acoustic transducer, a voice recognition apparatus, number dialing and call processing keys, and a user interface mechanism.

77. A portable communication device in accordance with claim 71 wherein the movement of the antenna between the first position and the second position causes the controller to generate a hookswitch control signal.

78. A portable communication device in accordance with claim 71 wherein the detector generates a hookswitch flash control signal responsive to the controller placing the portable communication device in the off-hook state, then in the on-hook state and then back in the off-hook state within a predetermined time period.

79. A portable communication device in accordance with claim 71;

wherein the antenna is moveable between a third position and a fourth position, wherein the portable communication device further comprises a second sensor for sensing when the antenna is in the third position and when the antenna is in the fourth position, wherein movement of the antenna to the third position causes the second sensor to sense that the antenna is in the third position, and wherein movement of the antenna to the fourth position causes the second sensor to sense that the antenna is in the fourth position; and wherein the controller places the portable communication device in a power-on state and a power-off state responsive to the second sensor sensing that the antenna is in the third position and in the fourth position, respectively.

80. A portable communication device in accordance with claim 79 wherein the first position, the second position, the third position and the fourth position of the antenna further comprise a first axial position along a longitudinal axis of the antenna, a second axial position along the longitudinal axis of the antenna, a first radial position about the longitudinal axis of the antenna, and a second radial position about the longitudinal axis of the antenna, respectively.

81. A portable communication device in accordance with claim 71 wherein the portable communication device comprises a radiotelephone.

82. A portable communication device comprising:
   an antenna being telescopically moveable between a first position and a second position;
   a first sensor for sensing when the antenna is in the first position and when the antenna is in the second position, wherein movement of the antenna to the first position causes the first sensor to sense that the antenna is in the first position, and wherein movement of the antenna to the second position causes the first sensor to sense that the antenna is in the second position; and
   a controller for placing the portable communication device in a power-on state and a power-off state responsive to the first sensor sensing that the antenna is in the first position and in the second position, respectively.

83. A portable communication device in accordance with claim 82 wherein the first position and the second postition comprise a unstowed position and an stowed postition, respectively.

84. A portable communication device in accordance with claim 82 wherein the first position and the second position comprise a first axial position and a second axial postition, respectively, along a longitudinal axis of the antenna.

85. A portable communication device in accordance with claim 82 wherein the movement of the antenna between the first position and the second position causes the controller to generate a power on/off control signal.

86. A portable communication device in accordance with claim 82:
   wherein the antenna is moveable between a third position and a fourth position,
   wherein the portable communication device further comprises a second sensor for sensing when the antenna is in the third position and when the antenna is in the fourth position, wherein movement of the antenna to the third position causes the second sensor to sense that the antenna is in the third position, and wherein movement of the antenna to the fourth position causes the second sensor to sense that the antenna is in the fourth position; and
   wherein the controller places the portable communication device in an on-hook state and an off-hook state responsive to the second sensor sensing that the antenna is in the third position and in the fourth position, respectively.

87. A portable communication device in accordance with claim 86 wherein the first position, the second position, the third position and the fourth position of the antenna further comprise a first radial position about a longitudinal axis of the antenna, a second radial position about the longitudinal axis of the antenna, a first axial position along the longitudinal axis of the antenna, and a second axial position along the longitudinal axis of the antenna, respectively.

88. A portable communication device in accordance with claim 82 wherein the portable communication device comprises a radiotelephone.

89. A wireless communication device comprising:
   a housing;
   communication circuitry disposed in the housing;
   an antenna coupled to an elongated antenna housing having a length dimension substantially greater than a width dimension, moveable between first and second positions relative to the housing, and coupled to the communications circuitry when the antenna is moved to at least one of the first and second positions;
   a detector, coupled to the antenna, for detecting the movement of the antenna between the first and second positions, wherein movement of the antenna causes the detector to be in a first state when the antenna is moved to the first position and causes the detector to be in a second state when the antenna is moved to the second position; and
   a controller, coupled to the detector and the communication circuitry, for placing the communication circuitry in power-off and power-on states responsive to the detector being in the first state and the second state, respectively.

90. A portable radiotelephone comprising:
   a transceiver;
   an antenna coupled to an elongated antenna housing having a length dimension substantially greater than a width dimension, coupled to the transceiver and moveable between a first position and a second position;
   a detector, coupled to the antenna, for detecting the movement of the antenna between the first and second positions, wherein movement of the antenna causes the detector to be in a first state when the antenna is moved to the first position and causes the detector to be in a second state when the antenna is moved to the second position; and
   a controller, coupled to the detector, for producing a power-off state and a power-on state when the detector is in the first state and the second state, respectively.

91. A portable radiotelephone comprising:
   a transceiver;
   an antenna coupled to an elongated antenna housing having a length dimension substantially greater than a width dimension, coupled to the transceiver and moveable between a first position and a second position;
   a detector, coupled to the antenna, for detecting the movement of the antenna between the first and second positions, wherein movement of the antenna causes the detector to be in a first state when the antenna is moved to the first position and causes the detector to be in a second state when the antenna is moved to the second position; and
   a controller, coupled to the detector, for producing a power on/off control signal when the detector changes between the first state and the second state.

92. A portable communication device comprising:
   an antenna coupled to an elongated antenna housing having a length dimension substantially greater than a width dimension and moveable between a first position and a second position;
   a first sensor for sensing when the antenna is in the first position and when the antenna is in the second position, wherein movement of the antenna to the first position causes the first sensor to sense that the antenna is in the first position, and wherein movement of the antenna to the second position causes the first sensor to sense that the antenna is in the second position; and
   a controller for placing the portable communication device in a power-on state and a power-off state responsive to the first sensor sensing that the antenna is in the first position and in the second position, respectively.

93. A portable communication device in accordance with claim 92 wherein the first position and the second postition comprise a unstowed position and an stowed postition, respectively.

94. A portable communication device in accordance with claim 92 wherein the first position and the second position comprise a first axial position and a second axial postition, respectively, along a longitudinal axis of the antenna.

95. A portable communication device in accordance with claim 92 wherein the movement of the antenna between the first position and the second position causes the controller to generate a power on/off control signal.

96. A portable communication device in accordance with claim 92:

wherein the antenna is moveable between a third position and a fourth position, wherein the portable communication device further comprises a second sensor for sensing when the antenna is in the third position and when the antenna is in the fourth position, wherein movement of the antenna to the third position causes the second sensor to sense that the antenna is in the third position, and wherein movement of the antenna to the fourth position causes the second sensor to sense that the antenna is in the fourth position; and wherein the controller places the portable communication device in an on-hook state and an off-hook state responsive to the second sensor sensing that the antenna is in the third position and in the fourth position, respectively.

97. A portable communication device in accordance with claim 96 wherein the first position, the second position, the third position and the fourth position of the antenna further comprise a first radial position about a longitudinal axis of the antenna, a second radial position about the longitudinal axis of the antenna, a first axial position along the longitudinal axis of the antenna, and a second axial position along the longitudinal axis of the antenna, respectively.

98. A portable communication device in accordance with claim 92 wherein the portable communication device comprises a radiotelephone.

99. A radiotelephone comprising;

a housing;

transceiver circuitry disposed in the housing;

an antenna being generally rod-shaped and being telescopically moveable relative to the housing between a retracted position and an extended position, the antenna being electrically coupled to the transceiver circuitry when the antenna is in at least one of the retracted position and the extended position, the antenna being disposed substantially within the housing when the antenna is in the retracted position, and the antenna being disposed substantially outside the housing when the antenna is in the extended position;

a detector, coupled to the antenna, for detecting when the antenna is in the retracted position and when the antenna is in the extended position, the movement of the antenna to the retracted position causing the detector to detect that the antenna is in the retracted position, and the movement of the antenna to the extended position causing the detector to detect that the antenna is in the extended position; and a controller, coupled to the detector, for placing the transceiver circuitry in an on-hook state when the detector detects that the antenna is in the retracted position and for placing the transceiver circuitry in an off-hook state when the detector detects that the antenna is in the extended position.

100. A telephone set comprising:

a housing;

an antenna being telescopically moveable relative to the housing between a contained position and an extracted position, the antenna being disposed substantially within the housing when the antenna is in the contained position, and the antenna being disposed substantially outside the housing when the antenna is in the extracted position;

an antenna position detection section, coupled to the antenna, for detecting when the antenna is in the contained position and when the antenna is in the extracted position, the movement of the antenna to the contained position causing the antenna position detection section to detect that the antenna is in the contained position, and the movement of the antenna to the extracted position causing the antenna position detection section to detect that the antenna is in the extracted position; and a controller, coupled to the antenna position detection section, for placing the telephone set in an on-hook state when the antenna position detection section detects that the antenna is in the contained position and for placing the telephone set in an off-hook state when the antenna position detection section detects that the antenna is in the extracted position.

* * * * *

UNITED STATES PATENT AND TRADEMARK OFFICE
CERTIFICATE OF CORRECTION

PATENT NO. : 5,898,933
DATED : April 27, 1999
INVENTOR(S) : Kaschke

It is certified that error appears in the above-indentified patent and that said Letters Patent is hereby corrected as shown below:

Claim 21

In column 19, line 67, please replace "the," with --the antenna,--.

Signed and Sealed this

Twenty-eighth Day of September, 1999

*Attest:*

Q. TODD DICKINSON

*Attesting Officer*      *Acting Commissioner of Patents and Trademarks*